US012764518B2

(12) United States Patent
Singh et al.

(10) Patent No.: US 12,764,518 B2
(45) Date of Patent: Oct. 13, 2026

(54) METHODS AND SYSTEMS FOR VIRTUAL SIM PROVISIONING

(71) Applicant: Adeia Guides Inc., San Jose, CA (US)

(72) Inventors: Gyanveer Singh, Bangalore (IN); Shrisha Rao, Bangalore (IN); Dhananjay Lal, Englewood, CO (US); Reda Harb, Tampa, FL (US)

(73) Assignee: Adeia Guides Inc., San Jose, CA (US)

( * ) Notice: Subject to any disclaimer, the term of this patent is extended or adjusted under 35 U.S.C. 154(b) by 392 days.

(21) Appl. No.: 18/373,832

(22) Filed: Sep. 27, 2023

(65) Prior Publication Data

US 2025/0106617 A1 Mar. 27, 2025

(51) Int. Cl.
*H04W 8/20* (2009.01)
*H04W 8/18* (2009.01)

(52) U.S. Cl.
CPC ........... *H04W 8/205* (2013.01); *H04W 8/183* (2013.01)

(58) Field of Classification Search
CPC .............................. H04W 8/205; H04W 8/183
See application file for complete search history.

(56) References Cited

U.S. PATENT DOCUMENTS 7,680,491 B2 3/2010 Zabawskyj et al.
9,853,670 B2 12/2017 Li
2021/0021986 A1* 1/2021 Chen ........................ H04W 8/22
2023/0370832 A1* 11/2023 Vaidyanathan ....... H04W 8/205

OTHER PUBLICATIONS

"Downloadable Test Profiles," [retrieved from URL: https://source.android.com/docs/core/connect/esim-test-profiles on Dec. 7, 2023], 2 pages.
"eSIM Whitepaper," [retrieved from URL: https://www.gsma.com/esim/wp-content/uploads/2018/12/esim-whitepaper.pdf], 21 pages (2018).
"eSIM: Architecture Specifications," [retrieved from URL: https://www.gsma.com/esim/esim-specification/ on Dec. 7, 2023], 5 pages.
"GSMA: Embedded SIM Remote Provisioning Architecture," [retrieved from URL: https://www.gsma.com/newsroom/wp-content/uploads/SGP.01-v4.0.pdf], 103 pages (2019).
"How is eSIM technology changing the consumer experience," [retrieved from URL: https://www.idemia.com/news/how-esim-technology-changing-consumer-experience-2021-10-22], 3 pages (2021).
"How much time does it take to get Jio eSIM ativated?" [retrieved from URL: https://www.jio.com/en-in/faq/esim/how-much-time-it-takes-to-activate-esim.html#/ on Dec. 7, 2023], 2 pages.

(Continued)

*Primary Examiner* — Ayodeji O Ayotunde
(74) *Attorney, Agent, or Firm* — HG Law LLP

(57) ABSTRACT

Systems and methods are described for temporarily provisioning a virtual SIM profile at a target device. A virtual SIM profile is received at a target device. A temporary virtual SIM use session of the virtual SIM profile is initiated at the target device. The virtual SIM profile is managed at the target device by disabling use of the virtual SIM profile at the target device in response to receiving an indication to end the temporary virtual SIM use session.

20 Claims, 13 Drawing Sheets

(56) References Cited

OTHER PUBLICATIONS

"Implementing eSIM," [retrieved from URL: https://source.android.com/docs/core/connect/esim-overview on Dec. 7, 2023], 25 pages.
"One Number Connectivity Plans," [retrieved from URL: https://www.vodafone.co.uk/mobile/onenumber on Dec. 7, 2023], 6 pages.
"SIMON: eSIM: 5G Explained," [retrieved from URL: https://www.simoniot.com/esim-5g-explained], 7 pages (2022).
"What is a MSISDN?" [retrieved from URL: https://www.wirelesslogic.com/iot-glossary/what-is-msisdn/ on Dec. 7, 2023], 6 pages.
Arici, A., "How to Use Android Guest Mode to Share Device without Compromising Privacy," [retrieved from URL: https://www.maketecheasier.com/use-android-guest-mode/], 16 pages (2021).
Burgess, B., "How to Enable Guest Mode on Android," [retrieved from URL: https://www.groovypost.com/howto/enable-guest-mode-on-android/], 16 pages (2022).
Kalnoskas, A., "eSIM connects machines, IoT devices to 5G networks," [retreived from URL https://www.5gtechnologyworld.com/esim-connects-machines-iot-devices-to-5g-networks/], 7 pages (2022).
O'Donell, R., "Twinning is key to connected devices, but what is it?" Techspot [ retrived from URL: https://www.techspot.com/news/60304-twinning-key-connected-devices-but-what.html] 7 pages (2015).
O'Halloran, J., "World's first 5G eSIM service goes live," [retrieved from URL: https://www.computerweekly.com/news/252485857/Worlds-first-5G-eSIM-service-goes-live], 2 pages (2020).
Romero, A., "Samsung's fourth Android 13 beta for Galaxy S22 now rolling out, strips multi-user support," [retrieved from URL: https://9to5google.com/2022/10/07/s22-android-13-beta-4/], 6 pages (2022).
Udin, E., "OPPO releases the world's first eSIM smartphone that supports 5G SA," [retrieved from URL: https://www.gizchina.com/2021/05/31/oppo-releases-the-worlds-first-esim-smartphone-that-supports-5g-sa/], 11 pages (2021).

* cited by examiner

METHODS AND SYSTEMS FOR VIRTUAL SIM PROVISIONING

BACKGROUND

The present disclosure relates to methods and systems for virtual SIM provisioning. Particularly, but not exclusively, the present disclosure relates to virtual SIM provisioning at a device.

SUMMARY

A SIM (Subscriber Identity Module or Subscriber Identification Module) card is an integrated circuit "smart" card intended to securely store an international mobile subscriber identity number and its related key, which are used to identify and authenticate subscribers on mobile telephone devices. A cellular network recognizes the SIM credentials and provides voice and data services (according to a user's subscription) to the mobile device in which it is placed. SIM cards are physical cards, and typically fit into a slot inside an extendable tray in a mobile device.

Currently, virtual SIMs (e.g., eSIMs (embedded SIMs), iSIMs (integrated SIMs)) are used in place of, or in addition to, physical SIM cards. A virtual SIM profile which comprises the information which would typically be found in SIM card can be transferred digitally to a device, such as when a user subscribes to a particular carrier, rather than requiring manual insertion of the SIM.

Generally, a virtual SIM is associated with a particular mobile number. A device on which the virtual SIM is configured is able to share functionality of the virtual SIM, such as the making and receiving of calls, with other devices. For example, a smartphone may carry the SIM, but may share the ability to make and receive calls with a smart watch which is connected to the smartphone. However, this may only work while the smart watch is connected to the smartphone (e.g., through a wired connection or through a short-range wireless protocol, such as Bluetooth), and may not work if the smart phone is off or too far from the smart watch. In other examples, devices belonging to the same user, such as a smartphone and a smart watch, may each have their own SIM, but may share a common mobile number. However, this may require separate data plans for each device (e.g., associated with each sim). Therefore, there exists a need to improve the flexibility of SIM usage.

Systems and methods are provided herein for enabling flexible SIM usage. For example, by enabling the transferal of a virtual SIM profile temporarily to a device other than the device on which the virtual SIM is currently operating, a user may temporarily (e.g., for a limited period of time) access functionality of the virtual SIM profile on another device. This may be particularly advantageous in a scenario in which the original device of the user (primary device) with which the virtual SIM generally operates is low on battery, where the transferal to a target device may enable continued use of the functions associated with a particular virtual SIM, without further draining the battery life of the primary device.

According to the systems and methods described herein, a virtual SIM profile associated with a primary device is received at a target device. A virtual SIM profile may be considered to comprise data which is storable on a virtual SIM (e.g., of the target device). The data comprised in the virtual SIM profile may comprise information such as an international mobile subscriber identity number and its related key, information relating to the carrier to which the virtual SIM profile corresponds, along with any or any combination of contacts stored in relation to the virtual SIM, network settings, a user's subscription, and so on. For example, a carrier (e.g., operator), may send the virtual SIM profile to the target device. A carrier may comprise at least one server, e.g., at the edge of the carrier network, which may facilitate transferal of the virtual SIM profile to the target device. A temporary virtual SIM use session corresponding to the virtual SIM profile may be initiated at the target device. The temporary virtual SIM use session may be initiated once functionality of the virtual SIM profile is available for use at the target device. For example, the installing of the virtual SIM profile at the target device may trigger the initiation of the temporary virtual SIM use session. A temporary virtual SIM use session may be a period of time over which functionality associated with the virtual SIM profile, such as a particular carrier (e.g., network), data on that network, and so on, is available for use by the target device. The virtual SIM use session (the temporary virtual SIM use session) may be a period of time in which the virtual SIM profile is used (or is authorized to be used), or may include a portion of time in which the virtual SIM profile is used (for example, the virtual SIM use session may be a period of time of the virtual SIM use session in which the virtual SIM profile is available and/or authorized for use at the target device). In some examples, functionality (e.g., usage of a particular network, or a data plan, or access to contacts) associated with the virtual SIM profile is enabled for use during the virtual SIM use session. The virtual SIM profile may be managed by disabling (e.g., suspending or removing) the virtual SIM profile at the target device in response to receiving an indication to end the temporary virtual SIM use session (e.g., where use of the virtual SIM profile is no longer authorized, or authorization has been revoked). For example, the ability to use the virtual SIM profile may be removed at the target device to end the temporary virtual SIM use session, or may be removed once the temporary virtual SIM use session has ended (e.g., once the use of functionality associated with the virtual SIM profile at the target device has ended). For example, the virtual SIM profile may be uninstalled and then deleted. In some examples, the virtual SIM profile may be disabled at the target device but stored for later use, whereby the virtual SIM profile may be reactivated once again by virtue of the processes described herein. For example, a virtual SIM profile may be downloaded to the target device the first time that a request is made to provision the virtual SIM profile at the target device, where once the use of the virtual SIM profile at that device has ended, the virtual SIM profile may be deactivated but remain on the target device for activation at a later point in time.

In some examples, an authorization process for receiving the virtual SIM profile associated with the primary device may be initiated at the target device or the primary device. For example, a user may perform an authentication process at the target device, or at a primary device, in order to request that a virtual SIM profile associated with a primary device of the user is transferred to the target device. The authorization process may comprise sending from the target device (or the primary device) to an authentication server a request to transfer the virtual SIM from the primary device to the target device. In response to the server authenticating the request (e.g., by verifying the identity of the user making the request, for example, by use of biometrics, passkey, pass number, and so on), an authentication indicator (e.g., authentication certificate) may be provided to the carrier (and/or a virtual SIM provisioning system) (by the target device or directly by the authentication server). The carrier (and/or a virtual SIM provisioning system) may then transfer the virtual SIM profile associated with the primary device to the target device.

In some examples, the virtual SIM profile is managed at a primary device by suspending the virtual SIM profile at the primary device prior to the initiating of the virtual SIM use session at the target device. For example, the virtual SIM profile may only be in use at one device at a time. Therefore, when the virtual SIM profile is sent to the target device, and in some cases, once the virtual SIM use session has been initiated, or prior to the sending of the virtual SIM profile to the target device, the virtual SIM may be effectively suspended (or in some cases removed) at the primary device, so that the primary device is not able to utilize functionality associated with the virtual SIM profile (e.g., use of the carrier) while the virtual SIM profile is in use at the target device. In some examples, the virtual SIM profile is activated at the primary device after the virtual SIM profile is disabled (e.g., removed from or suspended) at the target device. Thus, the virtual SIM profile may be reinstated at the primary device once the virtual SIM profile is not in use at the target device.

In some examples, prior to the target device receiving the virtual SIM profile, the primary device may send a signal indicating a request for use of the virtual SIM profile at the target device. For example, a user may request transferal of the virtual SIM to the target device through the primary device. This may be in response to receiving a prompt at the primary device from the target device to request transfer of the SIM, for example, in a case where the target device is a vehicle (e.g., where a vehicle may be any or any combination of an automobile, a car, a bus, an airplane, a tram, a truck, a van, and so on), and the user enters the vehicle with their primary device (e.g., a smartphone). In some examples, the primary device may send a signal indicating authorization of use of the virtual SIM profile at the target device. For example, the target device may request use of the virtual SIM profile, where the user may authenticate the request through the target device. In some examples, the primary device may send a signal indicating a low battery status of the primary device. For example, the primary device may signal that its battery is low, and may thus facilitate the transfer of the virtual SIM profile to another device (e.g., the target device) so that the functionality associated with the virtual SIM profile is still accessible to the user even if the battery dies, or so that use of the functionality associated with the virtual SIM (e.g., streaming) does not further drain the battery of the primary device. In some examples, the primary device may send a signal indicating multiple failed attempts to unlock the primary device have occurred (e.g., where the primary device has been stolen). For example, in a case where the primary device has been stolen, the user may wish to access their contacts and so on from another device.

In some examples, data associated with the virtual SIM profile is received. For example, the data may comprise any or any combination of contacts (stored as a part of the virtual SIM profile or on the primary device which is associated with the virtual SIM profile, or as part of a profile of the user, for example stored in cloud storage), call history, application data associated with the primary device, user data associated with the user of the primary device, or operating system settings associated with the primary device. Such data may be used to configure the target device, so that the user may experience use of the target device in a similar manner to that of the primary device.

In some examples, the indication to end the virtual SIM use session is based on an expiry of a predefined time period. In some examples, the indication to end the virtual SIM use session is based on a received request to end the current virtual SIM use session. For example, the user may request via the primary device or the target device that the virtual SIM is transferred back to the primary device. In some examples, the indication to end the virtual SIM use session is based on a number of calls made using the virtual SIM profile at the target device. For example, the number of calls which the virtual SIM can be used to make at the target device may be predetermined (e.g., based on user settings). In some examples, the indication to end the virtual SIM use session is based on any or any combination of an incoming call, an incoming text message, or an incoming notification. For example, where the target device is a car, an incoming call to the virtual SIM profile which is currently associated with the target device may trigger an end to the virtual SIM use session, or may trigger a temporary transferal of the virtual SIM profile back to the primary device, so that the user may take the call in a more private manner. Similarly, particular notifications or messages may trigger the transferal of the virtual SIM profile back to the primary device so that the user can respond. In some examples, e.g., where the virtual SIM profile has been transferred to a target device such as a smartphone which the user is borrowing from another user, an incoming call to the SIM originally provided in the target device may trigger a transferal of the virtual SIM back to the primary device, so that the second user can take the call (and similarly, for messages and notifications to which the another use may wish to respond).

In some examples, a plurality of virtual SIM profiles associated with a plurality of devices may be received at the target device. For example, a plurality of users of smartphones may transfer their virtual SIM profiles associated with each of their smartphones to a central device, such as a vehicle. In some examples, a virtual SIM profile to use during the virtual SIM use session at the target device may be selected from among the virtual SIM profiles. For example, the target device may select from among the plurality of virtual SIM profiles. The selection may be dynamic, for example, during the virtual SIM use session the target device may periodically or continuously select from among the plurality of virtual SIM profiles. In some examples, a sequence for use of virtual SIM profiles of the plurality of virtual SIM profiles may be determined. For example, the order in which the virtual SIM profiles are to be used, and/or the time period for which the virtual SIM profiles are to be used, may be determined. In some examples, functionality associated with the selected virtual SIM profile is enabled at the target device. For example, once a virtual SIM has been selected, functionality such as a carrier associated with that virtual SIM may be used, for example, to stream music. Where the selection is performed and another virtual SIM is in use, the profile associated with the virtual SIM that is in use may be suspended prior to the functionality associated with the virtual SIM profile that has been selected being enabled. For example, the target device may swap between virtual SIM profiles (e.g., where the selection of a new virtual SIM profile may trigger the end of a current virtual SIM use session and start a new virtual SIM use session).

In some examples, the virtual SIM profile is selected based on the consistency of coverage of a network carrier associated with the virtual SIM profiles relative to a location of the target device. For example, the target device may select a virtual SIM having the most consistent coverage of network (e.g., in its current location). For example, a mapping application of the target device may indicate an intended route of the target device, and thus, a virtual SIM profile, or a combination of different virtual SIM profiles, may be selected which will provide the most consistent coverage as the target device moves through the route. In some examples, the virtual SIM is selected based on the strength of coverage of a network carrier associated with the virtual SIM profiles relative to a location of the target device. For example, the virtual SIM profile, or a sequence of different virtual SIM profiles, with the strongest coverage, or the strongest average coverage in a particular area, may be selected. For example, a mapping application of the target device may indicate an intended route of the target device, and thus the virtual SIM having the best coverage as the target device moves through the route may be selected. In some examples, a sequence of virtual SIM profiles may be used in order to provide the best possible coverage. In some examples, the virtual SIM profile(s) is selected based on a data plan associated with the virtual SIM profiles. For example, the virtual SIM profile having the largest amount of data on its data plan may be selected, or having the largest amount of data left on a plan. In some examples, the virtual SIM is selected based on a length of a current journey of the target device. For example, it may be determined that a plurality of virtual SIM profiles are available to the target device. The target device may determine the time that a current journey involving the target device will take (e.g., based on a mapping application), where each of the virtual SIMs may be assigned for use for a different portion of the journey (e.g., where the time that each virtual SIM profile is used for may be the same). The assignation of the virtual SIM profiles may additionally or alternatively be based on any of the aforementioned parameters, such as network coverage associated with particular virtual SIM profiles, data subscriptions available for particular virtual SIM profiles, and so on.

In some examples, when a further virtual SIM profile is selected to use at the target device, a streaming service of the target device currently in use may be notified of the upcoming change in virtual SIM profile. This may enable the streaming service to pre-empt a period of loss of network connection, and may cause the streaming service to buffer data accordingly.

In some examples, a wi-fi hotspot is initiated (e.g., at the target device) based on the virtual SIM profile. For example, the virtual SIM profile may be used to provide a network connection for a wi-fi hotspot. For example, where the target device is a vehicle, such as a car, the virtual SIM profile may be used to form a wi-fi hotspot, which may then be used by the primary device, and may be used by any other user devices in the vehicle, such as the devices of any other passengers.

In some examples, the target device is any or any combination of a vehicle, a smartphone, a tablet, a smart watch, a drone, or a device configured to operate as a wi-fi hotspot. The primary device may be any of or any combination of a vehicle, a smartphone, a tablet, a smart watch, a drone. For example, the primary device may be a smartphone, and the target device may be a vehicle, where it may be advantageous to transfer a virtual SIM profile to a vehicle, so that the battery life of the smartphone can be conserved.

According to the systems and methods described herein, a virtual SIM profile is temporarily provisioned at a target device. In some examples, the virtual SIM profile is provisioned from a primary device.

According to the systems and methods described herein, a request is received to transfer a virtual SIM profile to a target device. A suspension message is sent to a primary device indicating that the virtual SIM profile is to be suspended. The virtual SIM profile is sent to the target device.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
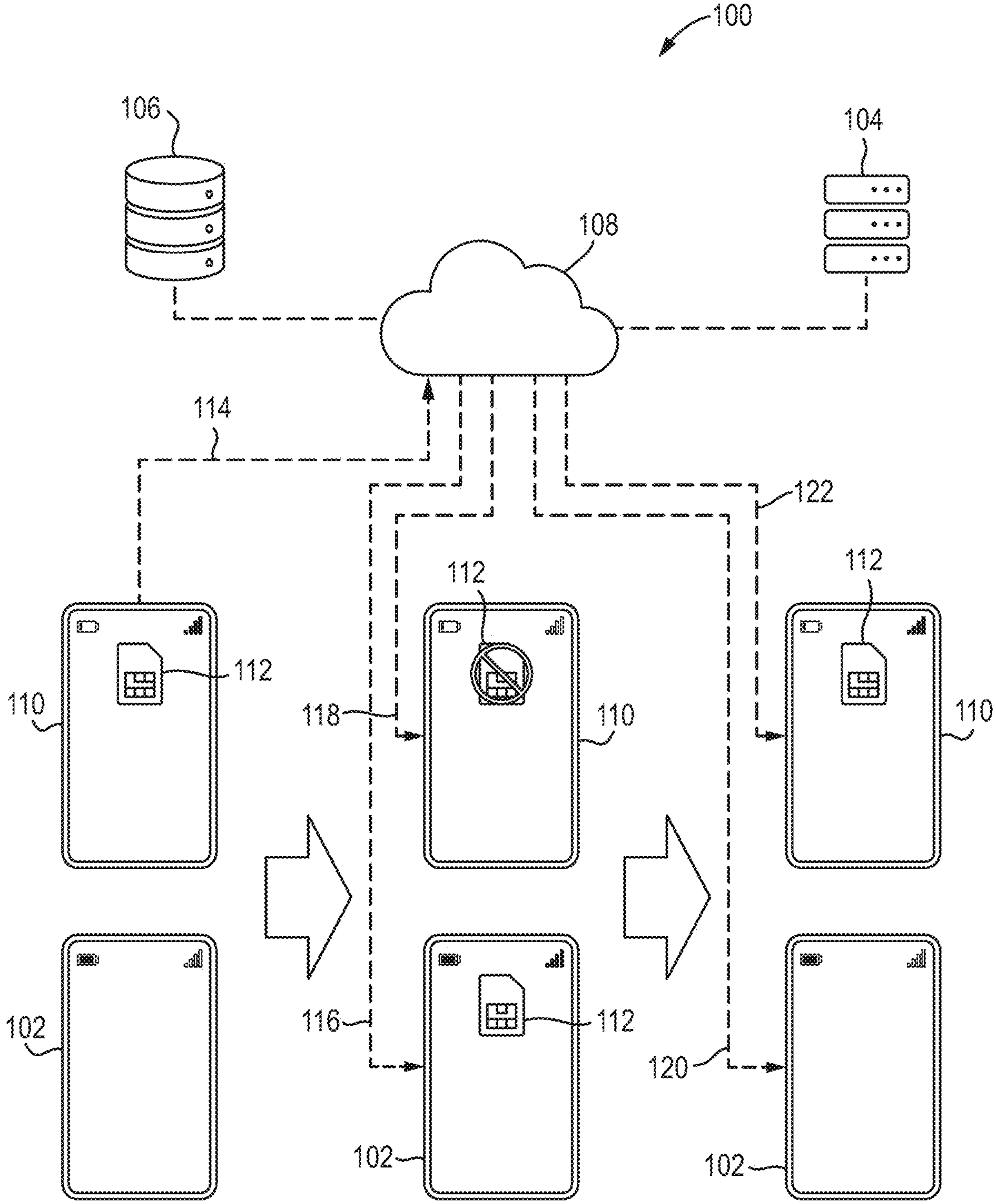
FIG. 1 illustrates an overview of the system for temporarily transferring a virtual SIM profile, in accordance with some examples of the disclosure.

FIG. 1 illustrates an overview of a system 100 for temporarily provisioning a virtual SIM profile at a secondary device. In particular, the example shown in FIG. 1 illustrates a target device 102, which in this example is a smartphone, however, the target device may be any device having cellular capabilities. The target device is communicatively coupled to a server 104 and a content item database 106, e.g., via network 108. The server 104 may be part of a remote SIM provisioning system. The server 104 may be in communication with, or part of the network of, a carrier (e.g., network operator). For example, the server 104 may be a subscription manager, SM, server, a subscription manager data preparation, SM-DP, server, a subscription manager secure routing, SM-SR, server, a subscription manager server combining the functionality of the SM-DP and SM-SR (SM-DP+), and so on (the server 104 may additionally represent any number of servers, such as any combination of the aforementioned servers). In this manner, the target device is able to receive information such as virtual SIM profiles from the server 104 (e.g., from the carrier). FIG. 1 further illustrates a primary device 110, which in this example is also communicatively coupled to the server 104 and the content item database 106, e.g., via network 108.

In this example, the primary device 110 sends a request 114 for transferal of a virtual SIM profile 112 associated with the primary device 110 (e.g., active on the primary device 110) to the target device 102. In this example, the request 114 is sent to the same server 104 which is configured to provision SIMs, however, it will be appreciated that the request may be sent to a different server, for example, a server of the operating system of the primary device 110, e.g., for an authentication process to verify the request, where the server of the operating system of the primary device 110 may then send an address of the server 104 to the target device 102, or may forward the request to the server 104. The server 104 may be in communication with a network operator (e.g., carrier). In some examples, the request is sent instead from the target device 102. For example, in some examples, the target device 102 may perform an authentication process, for example, with a server of the operating system of the primary device 110, in order to verify that a user associated with the primary device 110 authenticates transferal of the virtual SIM profile 112 to the target device 102.

The request 114 may be performed via an application or through the operating system of the primary device 110 or the target device 102. For example, an application may be provided on the primary device 110 or the target device 102 which enables a request to be made to temporarily transfer the virtual SIM profile 112 of the primary device 110 to the target device 102. Similarly, the operating system of either device may be configured to provide an option to request transfer of a virtual SIM profile 112 from the primary device 110 to a target device 102.

After the request 114 has been made to transfer the virtual SIM profile 112 from the primary device 110 to the target device 102, the server 104 may send to the target device 102 a message 116 comprising the virtual SIM profile 112. Thus, the virtual SIM profile 112 is received at the target device 102. The server 104 may additionally send to the primary device 110 a suspension request 118 to suspend use of the virtual SIM profile 112 at the primary device 110. The primary device 110 may suspend functionality associated with the virtual SIM profile 112 in response to receiving the suspension request.

Once the target device 102 has received the virtual SIM profile 112, the target device 102 may initiate a temporary virtual SIM use session of the virtual SIM profile 112. For example, the target device 102 may install the virtual SIM profile 112, and/or may enable functionality associated with the virtual SIM profile 112. In some examples, the target device 102 may initiate a connection to services associated with the virtual SIM profile 112, such as a connection to the network 108 carrier associated with the virtual SIM profile 112. Additionally or alternatively, the target device 102 may configure a contacts list associated with the virtual SIM profile 112 for a user of the target device 102 to access. In some examples, additional data is received along with the virtual SIM profile 112, such as settings of the operating system of the primary device 110, applications associated with the primary device 110, and so on. The target device 102 may utilize the additional data to configure the target device 102, such as to configure settings of the operating system of the target device 102.

At a period of time after the temporary virtual SIM use session has been established, the target device 102 may receive an indication 120 to end the temporary virtual SIM use session. In this example, the indication 120 is received from the server 108, however, it will be appreciated that the indication may be an indication generated by the primary device 110 or the target device 102. For example, the indication 120 to end the temporary virtual SIM use session may be an indication that a predetermined amount of time has elapsed. In other examples, the indication may be based on a request received, for example, from the primary device 110 (e.g., via the server 104), or from the target device 102, to end the current virtual SIM use session. In other examples, the indication may be based on the fulfilling of a particular set of preconditions, such as a number of calls made using the virtual SIM profile 112 at the target device 102, an amount of data used using the virtual SIM profile 112, and so on. In some examples, the indication may be based on an incoming call, an incoming text message, or an incoming notification, to the virtual SIM profile 112, or to another virtual SIM profile 112 associated with the target device 102. The target device 102 may manage the virtual SIM profile at the target device 102 by disabling use of the virtual SIM profile 112 at the target device 102 in response to receiving the indication to end the temporary virtual SIM use session. For example, the target device 102 may delete the virtual SIM profile 112, or may suspend the virtual SIM profile 112 (for example, where both devices are associated with the same user, and it is likely that the user will wish to transfer their virtual SIM back to the target device 102 at some point in the future).

Once the virtual SIM profile 112 has been disabled at the target device 102, the virtual SIM profile 112 may be reactivated at the primary device 110. A signal 122 may be sent from the server 104 to the primary device 110 in order that the primary device 110 knows to re-activate the virtual SIM profile 112.

In the example illustrated in FIG. 1, the target device 102 is a smart phone. However, it will be appreciated that any device having cellular capabilities may receive the virtual SIM profile 112. For example, any device having eSIM and/or iSIM capabilities may receive the virtual SIM profile 112. In some examples, the target device 102 is a smartphone, smart watch, tablet, laptop, desktop computer, smart TV, vehicle, drone, and so on.

Figure 2:
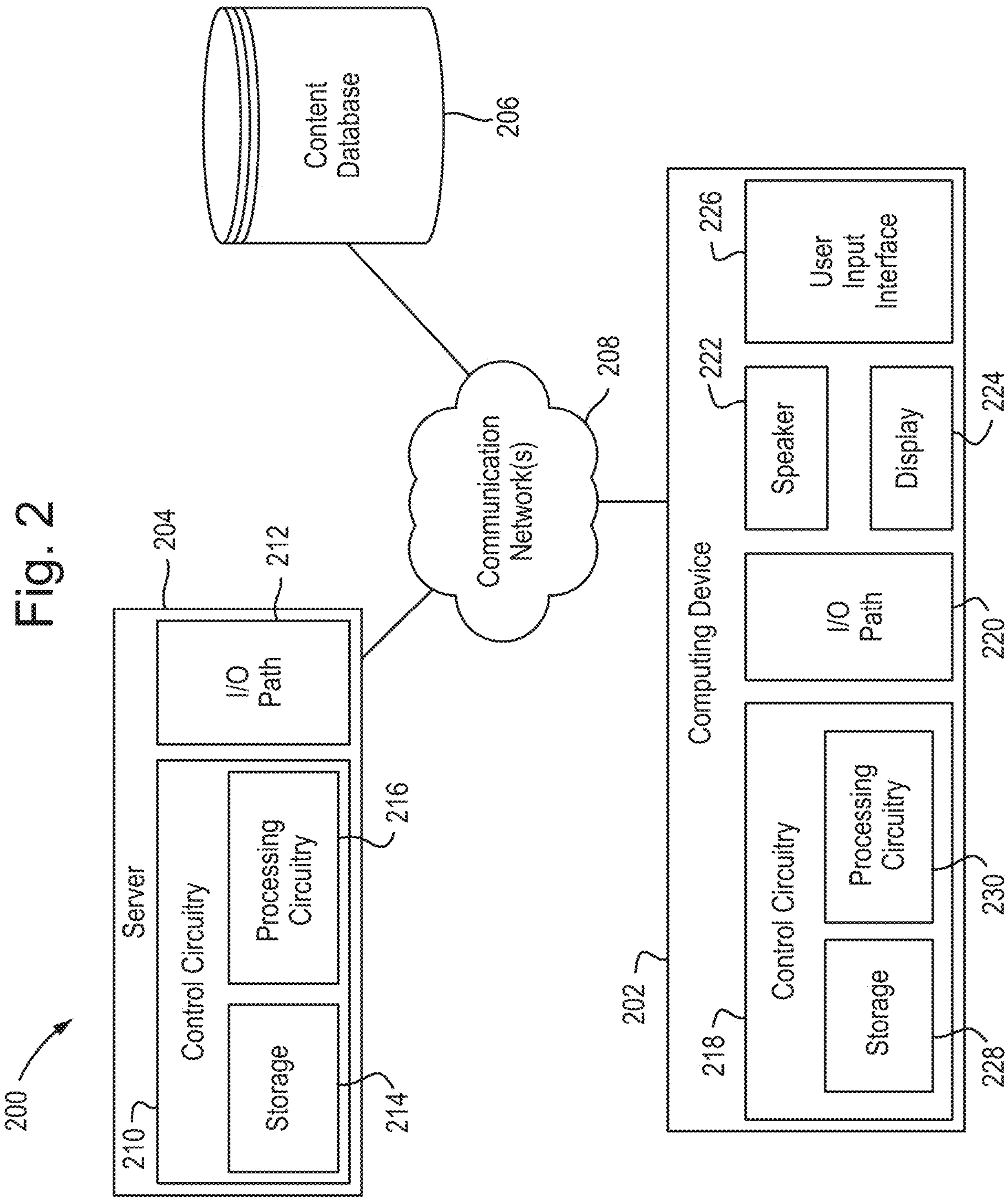
FIG. 2 is a block diagram showing components of an example system for transferring a virtual SIM profile, in accordance with some examples of the disclosure.

FIG. 2 is an illustrative block diagram showing example system 200, e.g., a non-transitory computer-readable medium, configured to temporarily provisioning a virtual SIM at a secondary device. Although FIG. 2 shows system 200 as including a number and configuration of individual components, in some examples, any number of the components of system 200 may be combined and/or integrated as one device, e.g., as target device 102, and/or primary device 110. System 200 includes computing device n-202 (denoting any appropriate number of computing devices, target device 102, and/or primary device 110), server n-204 (denoting any appropriate number of servers, such as server 104), and one or more content databases n-206 (denoting any appropriate number of content databases, such as content database 106), each of which is communicatively coupled to communication network 208, which may be the Internet or any other suitable network or group of networks, such as network 108. In some examples, system 200 excludes server n-204, and functionality that would otherwise be implemented by server n-204 is instead implemented by other components of system 200, such as computing device n-202. For example, computing device n-202 may implement some or all of the functionality of server n-204, allowing computing device n-202 to communicate directly with content database n-206. In still other examples, server n-204 works in conjunction with computing device n-202 to implement certain functionality described herein in a distributed or cooperative manner.

Server n-204 includes control circuitry 210 and input/output (hereinafter "I/O") path 212, and control circuitry 210 includes storage 214 and processing circuitry 216. Computing device n-202, which may be an HMD, a personal computer, a laptop computer, a tablet computer, a smartphone, a smart television, or any other type of computing device, includes control circuitry 218, I/O path 220, speaker 222, display 224, and user input interface 226. Control circuitry 218 includes storage 228 and processing circuitry 220. Control circuitry 210 and/or 218 may be based on any suitable processing circuitry such as processing circuitry 216 and/or 230. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some examples, processing circuitry may be distributed across multiple separate processors, for example, multiple of the same type of processors (e.g., two Intel Core i9 processors) or multiple different processors (e.g., an Intel Core i7 processor and an Intel Core i9 processor).

Each of storage 214, 228, and/or storages of other components of system 200 (e.g., storages of content database 206, and/or the like) may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 2D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Each of storage 214, 228, and/or storages of other components of system 200 may be used to store various types of content, metadata, and or other types of data. Non-volatile memory may also be used (e.g., to launch a boot-up routine and other instructions). Cloud-based storage may be used to supplement storages 214, 228 or instead of storages 214, 228. In some examples, control circuitry 210 and/or 218 executes instructions for an application stored in memory (e.g., storage 214 and/or 228). Specifically, control circuitry 210 and/or 218 may be instructed by the application to perform the functions discussed herein. In some implementations, any action performed by control circuitry 210 and/or 218 may be based on instructions received from the application. For example, the application may be implemented as software or a set of executable instructions that may be stored in storage 214 and/or 228 and executed by control circuitry 210 and/or 218. In some examples, the application may be a client/server application where only a client application resides on computing device n-202, and a server application resides on server n-204.

The application may be implemented using any suitable architecture. For example, it may be a stand-alone application wholly implemented on computing device n-202. In such an approach, instructions for the application are stored locally (e.g., in storage 228), and data for use by the application is downloaded on a periodic basis (e.g., from an out-of-band feed, from an Internet resource, or using another suitable approach). Control circuitry 218 may retrieve instructions for the application from storage 228 and process the instructions to perform the functionality described herein. Based on the processed instructions, control circuitry 218 may determine what action to perform when input is received from user input interface 226.

In client/server-based examples, control circuitry 218 may include communication circuitry suitable for communicating with an application server (e.g., server n-204) or other networks or servers. The instructions for carrying out the functionality described herein may be stored on the application server. Communication circuitry may include a cable modem, an Ethernet card, or a wireless modem for communication with other equipment, or any other suitable communication circuitry. Such communication may involve the Internet or any other suitable communication networks or paths (e.g., communication network 208). In another example of a client/server-based application, control circuitry 218 runs a web browser that interprets web pages provided by a remote server (e.g., server n-204). For example, the remote server may store the instructions for the application in a storage device. The remote server may process the stored instructions using circuitry (e.g., control circuitry 210) and/or generate displays. Computing device n-202 may receive the displays generated by the remote server and may display the content of the displays locally via display 224. This way, the processing of the instructions is performed remotely (e.g., by server n-204) while the resulting displays, such as the display windows described elsewhere herein, are provided locally on computing device n-202. Computing device n-202 may receive inputs from the user via input interface 226 and transmit those inputs to the remote server for processing and generating the corresponding displays.

A computing device n-202 may send instructions, e.g., to initiate temporary transferal of a virtual SIM profile, to control circuitry 210 and/or 218 using user input interface 226.

User input interface 226 may be any suitable user interface, such as a remote control, trackball, keypad, keyboard, touchscreen, touchpad, stylus input, joystick, voice recognition interface, gaming controller, or other user input interfaces. User input interface 226 may be integrated with or combined with display 224, which may be a monitor, a television, a liquid crystal display (LCD), an electronic ink display, or any other equipment suitable for displaying visual images.

Server n-204 and computing device n-202 may transmit and receive content and data via I/O path 212 and 220, respectively. For instance, I/O path 212, and/or I/O path 220 may include a communication port(s) configured to transmit and/or receive (for instance to and/or from content database n-206), via communication network 208, content item identifiers, content metadata, natural language queries, and/or other data. Control circuitry 210 and/or 218 may be used to send and receive commands, requests, and other suitable data using I/O paths 212 and/or 220.

As is discussed above, traditionally, a SIM is a physical SIM card which can be removed and inserted into a device by a user, where the data required for, for example, connecting to a mobile network is housed in the physical SIM card. For virtual SIMs, in contrast, a virtual SIM profile, which may comprise the data typically found on a physical SIM card, can be downloaded to a secure element embedded in a device, where this secure element is termed a "virtual SIM". Currently, a virtual SIM may be an eSIM, which is a separate chip implanted within a device (e.g., an eUICC), which may be soldered inside a device), or an iSIM, which is a secure element incorporated into the device's hardware. Virtual SIMs can accommodate SIM profiles (in some cases, multiple SIM profiles, where each profile may comprise the operator and subscriber data that would have otherwise been stored on a traditional SIM card). A virtual SIM profile typically comprises operator data related to a subscription, including the operator's credentials, and in some cases, operator or third-party SIM based applications. As the size of the virtual SIM profile is typically in the range of KBs, it can instantly be downloaded and provisioned on the virtual SIM supported device. In some configurations, virtual SIM profiles may be activated and installed on a device instantly upon user verification. With respect to virtual SIMs, the integrity of traditional SIM cards is upheld by using secure manufacturing facilities, including loading of operator credentials and software. Operator logistics channels then distribute the virtual SIM profiles to the required endpoints. It will be appreciated that the present invention may apply to any type of SIM which may be transferred digitally.

Currently, the Global System for Mobile Communications Association (GSMA) has created solutions suited to different types of distribution channels, which may also contain 'business logic' dictating who has control of device connections. These solutions are generally classified as a Consumer solution (e.g., where the end user (or consumer) has a direct choice of the operator supplying connectivity) and a M2M (machine to machine) or B2B (business to business) solution. It will be appreciated that the solutions described herein may apply to either solution.

Figure 3:
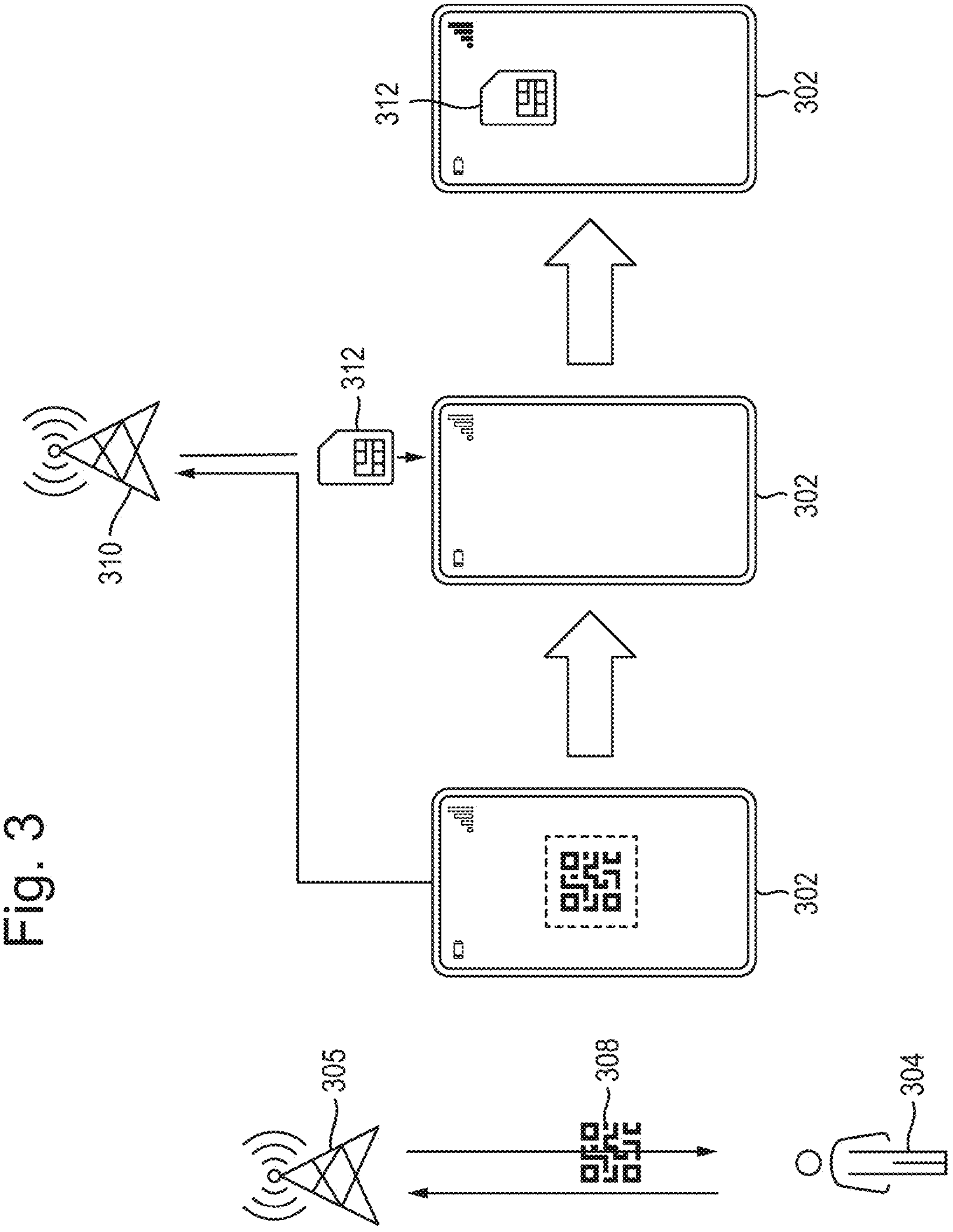
FIG. 3 illustrates an example of provisioning a virtual SIM profile at a primary device.

Provisioning of a virtual SIM profile at a primary device will be briefly described. FIG. 3 illustrates an example of provisioning of a virtual SIM profile at a primary device 302. As illustrated, at FIG. 3, a user 304 who has purchased a subscription (e.g., who has set up a contract) with their chosen mobile network operator 305 receives instructions on how to connect their device (primary device 302) to the operator's Remote SIM Provisioning system 306 (e.g., a letter comprising instructions on receiving a virtual SIM profile). In this example a QR (Quick Response) code 308 is used. The QR code 308 contains the address of the remote SIM provisioning system 306 (for example, a subscription manager, SM, a subscription manager data preparation, SM-DP, server, a subscription manager secure routing, SM-SR, server, a subscription manager server combining the functionality of the SM-DP and SM-SR (SM-DP+), and so on, e.g., within the GSMA specifications), which allows the device 302 to connect to remote SIM provisioning system 306 and securely download a (virtual) SIM profile 312. While the use of QR codes is illustrated in FIG. 3, any appropriate means may be used in order to connect the primary device 302 to the network. In particular, alternatives include pre-configured devices, the use of a subscription manager discovery server, SM-DS, and companion devices. Once the virtual SIM profile 312 is installed and activated, the device 302 is able to connect to that operator's network. An eSIM or iSIM of the primary device 302 may be configured to hold more than one virtual SIM profile at a time. Therefore, the process may be repeated in respect of a different carrier or operator to obtain a further virtual SIM profile at the primary device 302, where the user 304 may then switch between virtual SIM profiles (e.g., carriers) as desired.

Figure 4:
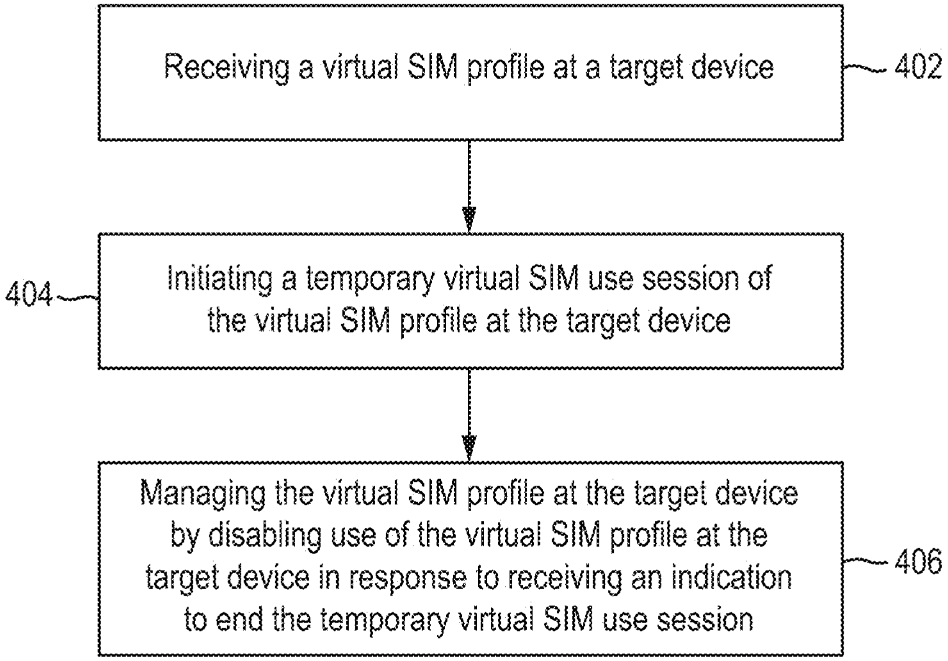
FIG. 4 is a flow chart showing a process for the temporary transferal of a virtual SIM profile to a target device, in accordance with some examples of the disclosure.

FIG. 4 shows a flowchart representing an illustrative process 300 for the temporary transferal of a virtual SIM profile to a secondary device, such as the target device 102 shown in FIG. 1. While the example shown in FIG. 4 refers to the use of system 100, as shown in FIG. 1, it will be appreciated that the illustrative process 300 shown in FIG. 4 may be implemented, in whole or in part, on system 100, system 200, and/or any other appropriately configured system architecture. For the avoidance of doubt, the term "control circuitry" used in the below description applies broadly to the control circuitry outlined above with reference to FIG. 2. For example, control circuitry may comprise control circuitry of the target device 102, control circuitry of the primary device 110 and control circuitry of the server 104, working either alone or in some combination.

At 402, control circuitry, e.g., control circuitry of the target device 102, receives a virtual SIM profile 112 at the target device 102. In some examples, prior to the target device 102 receiving the virtual SIM profile 112, control circuitry, e.g., control circuitry of the primary device 110 or the target device 102, sends a signal indicating any, or any combination of, a request for use of the virtual SIM profile 112 at the target device 102, authorization of use of the virtual SIM profile 112 at the target device 102, a low battery status of the primary device 110, or multiple failed attempts to unlock the primary device 110 occurring. In some examples, additional data associated with the virtual SIM profile 112 is received, for example, along with the virtual SIM profile 112. The data may comprise any, or any combination of, contacts, call history, application data associated with a primary device 110, user data associated with the user of a primary device 110, or operating system settings associated with a primary device 110. Where a signal is sent requesting provisioning of the virtual SIM profile, the system may also receive an authentication signal, for example, authorizing the provisioning of the virtual SIM profile (e.g., a user identity such as a password, biometric authorization, and so on, input at the target device). The system may then retrieve the device ID of the primary device registered with the user ID, and suspend the usage of the SIM at the primary device. Once a request for virtual SIM provisioning on a target device 102 has been received (e.g., along with the relevant authorization), the system may output a request that the first user provide a primary device ID (e.g., smartphone, tablet, etc.) on which virtual profile is to be suspended, particularly in a case where multiple devices each with a virtual SIM profile 112 are associated with the user ID. For example, where the request for transferal of the virtual SIM profile 112 is made via the target device 102, and where there is more than one primary device 110 on which a virtual SIM profile 112 is active, the system may wish to determine the specific device on which the virtual SIM profile 112 is to be suspended. The system may also determine the device ID for which the virtual SIM profile 112 will be suspended based on the nature of the target device 102 or the intended task the user wishes to perform on the target device 102. For example, the virtual SIM profile 112 may be transferred from the same type of device as the type of target device 102. In another example, a device that matches a profile of the target device 102 (e.g., has similar or the same capabilities of the target device 102) can be selected as the device from which the virtual SIM profile 112 will be obtained.

At 404, control circuitry, e.g., control circuitry of the target device 102, initiates a temporary virtual SIM use session of the virtual SIM profile 112 at the target device 102. For example, a temporary virtual SIM use session may begin once the virtual SIM profile 112 is installed at the target device 102, or once functionality associated with the virtual SIM profile 112, such as the communication with a carrier of the virtual SIM profile 112, is enabled. In some examples, control circuitry, e.g., control circuitry of the primary device 110, manages the virtual SIM profile 112 by suspending the virtual SIM profile 112 at the primary device 110 prior to the initiating of the virtual SIM use session (e.g., temporary virtual SIM use session) at the target device 102. The system may suspend the virtual SIM profile 112 of the first user on the primary device 110 before provisioning the virtual SIM profile 112 on the target device 102.

Once the virtual SIM profile 112 is enabled on the target device 102, the functionality associated with the virtual SIM profile 112, such as access to a cellular network 108 associated with the virtual SIM profile 112, can be used. For example, calls may be made from the target device 102 or mobile data may be used, for example, to access the internet. In an example, when a call is initiated from the target device 102, the mobile number associated with the primary device 110 may be used, rather than a number associated with the target device 102. Where the target device 102 is associated with a (second) user other than the user of the primary device 110, the mobile number of the second user is not used, and the identity of the second user is thus secured (for example, by using the virtual SIM associated with the first user, a person receiving the call will provided with the details of the first user and no details of the second user will be provided or sent to the called person). A person receiving the call may see the identity of the first user as the calling user and hence can take a decision to accept or deny the call. The call may be allowed based on the subscription and available recharge associated with a registered number of the first user only, and no charge will be applicable for the phone number of the second user.

At 406, control circuitry, e.g., control circuitry of the target device 102, manages the virtual SIM profile 112 at the target device 102 by disabling use of the virtual SIM profile 112 at the target device 102 in response to receiving an indication to end the temporary virtual SIM use session. The indication may be received from the server 104, the primary device 110, or the target device 102 (e.g., the target device may determine when to end the temporary virtual SIM use session and signal to the eSIM or iSIM that the virtual SIM profile is to be disabled). In some examples, the indication to end the virtual SIM use session is based on any, or any combination of, an expiry of a predefined time period, a received request to end the current virtual SIM use session, a number of calls made using the virtual SIM profile 112 at the target device 102, an incoming call, an incoming text message, or an incoming notification. In some examples, the application may limit its usage to avoid misuse. For example, to limit misuse, the system may limit the frequency of the calls, the duration of the calls, or the time for which the virtual SIM is temporarily configured at the target device 102. For example, the system may allow the first user to make only 5 calls or calls for up to 15 minutes in total at the target device 102, or the virtual SIM profile 112 may revert back to the primary device 110 after 15 minutes. For making an additional call, the second user may re-authenticate use of the virtual SIM profile 112 at the target device 102 after a fixed number of calls or a fixed duration. As mentioned above, the system may receive a time limit for which the virtual SIM profile 112 should be provisioned on the target device 102 (e.g., from the primary device 110, target device 102, via the first user or the second user). The system may suspend the virtual SIM profile 112 at the primary device 110 and provision the profile on the target device 102 only for the designated time period. On expiry of the time period or in response to a request for the virtual SIM to be transferred back to the primary device 110, the system may suspend the virtual SIM profile 112 of the first user at the target device 102.

In some examples, users may enable or disable the third-party call option on their personal devices. However, the system may provide an incentive to enable third-party calls by enabling reciprocal privileges. For example, the system may check if the first user has enabled the third-party call feature on their device. The system may process the first user requests only if the first user has enabled third-party calls on their device.

In some examples, control circuitry, e.g., control circuitry of the target device 102, initiates a wi-fi hotspot based on the virtual SIM profile 112. For example, where the target device 102 is a vehicle, it may be advantageous to temporarily provision a virtual SIM profile 112 at the vehicle, such as when a user is present within the vehicle, so that the user may access functionality associated with the virtual SIM profile 112 through the vehicle, rather than through, for example, their smartphone. Thus, in such a configuration, the vehicle could utilize the virtual SIM profile 112 to create a wi-fi hotspot, so that passengers in the vehicle can make use of the hotspot.

In some examples, control circuitry, e.g., control circuitry of the target device 102, receives a plurality of virtual SIM profiles 112 associated with a plurality of devices, and selects, from among the plurality of virtual SIM profiles 112, a virtual SIM profile 112 to use during the virtual SIM use session at the target device 102. In some examples, the virtual SIM profile 112 is selected based on any, or any combination of, the consistency of coverage of a network carrier associated with the virtual SIM profiles 112 relative to a location of the target device 102, the strength of coverage of a network 108 carrier associated with the virtual SIM profile 112*s* relative to a location of the target device 102, a data plan associated with the virtual SIM profile 112*s*, or a length of a current journey of the target device 102. In some examples, the target device 102 selects from among the virtual SIM profiles 112 more than once, where the use of each virtual SIM profile 112 may correspond to a respective virtual SIM use session for that virtual SIM profile 112. Thus, a series of virtual use sessions may be performed at the target device 102, for example, when the device switches between virtual SIM profiles 112. While one of the plurality of virtual SIM profiles 112 is not in use, the virtual SIM profile 112 may be suspended at the target device. The virtual SIM profile may be reactivated at the primary device while the virtual SIM profile is not in use. When a further virtual SIM profile 112 is selected to use for a virtual SIM use session at the target device 102, the method may further comprise notifying a streaming service of the target device 102 currently in use of the upcoming change in virtual SIM (e.g., a break between virtual SIM use sessions).

For example, where, as described above, the second device is a vehicle, a plurality of users may enable the provisioning of virtual SIM profiles 112 associated with their respective devices at the vehicle. In some examples, the vehicle may select from among the virtual SIM profiles 112 a virtual SIM profile 112 to use during a temporary virtual SIM use session. In some examples, the vehicle may continuously or periodically determine which virtual SIM profile 112 should be used. For example, the vehicle may assess the network 108 coverage or strength at the vehicle's current location, and may then select from among the virtual SIM profiles 112 based on which of the virtual SIM profiles 112 will provide the best network 108 coverage and/or network 108 strength. In some examples, the vehicle may determine a (likely) route to be taken by the vehicle (e.g., based on a routing application), and may determine a sequence for use of the virtual SIM profiles 112, and/or may divide the time the route is likely to take into equal portions, for example, so that each virtual SIM profile 112 may be used for an equal time period, based on any, or any combination of, the considerations outlined above.

In some examples, a target device 102, such as a vehicle, may request transfer of a virtual SIM profile 112 of a device within or adjacent to the vehicle (e.g., such as a passenger of the vehicle) in the event of an emergency such as an accident, such that the device may be used to, or may automatically, contact emergency services.

In some examples control circuitry, e.g., control circuitry of the primary device 110 manages the virtual SIM profile 112 at the primary device 110 by activating the virtual SIM profile 112 at the primary device 110 after use of the virtual SIM profile 112 is disabled at the target device 102. Where the target device is a vehicle, for example, once the journey has ended and the user(s) have exited the vehicle, all virtual SIM profiles at the vehicle may be deleted or suspended, and the virtual SIM profile(s) restored at the primary device 110.

While the above examples are described in relation to smartphones and vehicles, it will be appreciated that the target device 102 may be any device which is capable of connecting to a mobile network (e.g., Global System for Mobile communication, GSM). For example, the target device 102 may be any, or any combination of, a vehicle, a smartphone, a tablet, a smart watch, a drone, or a device configured to operate as a wi-fi hotspot.

Figure 5:
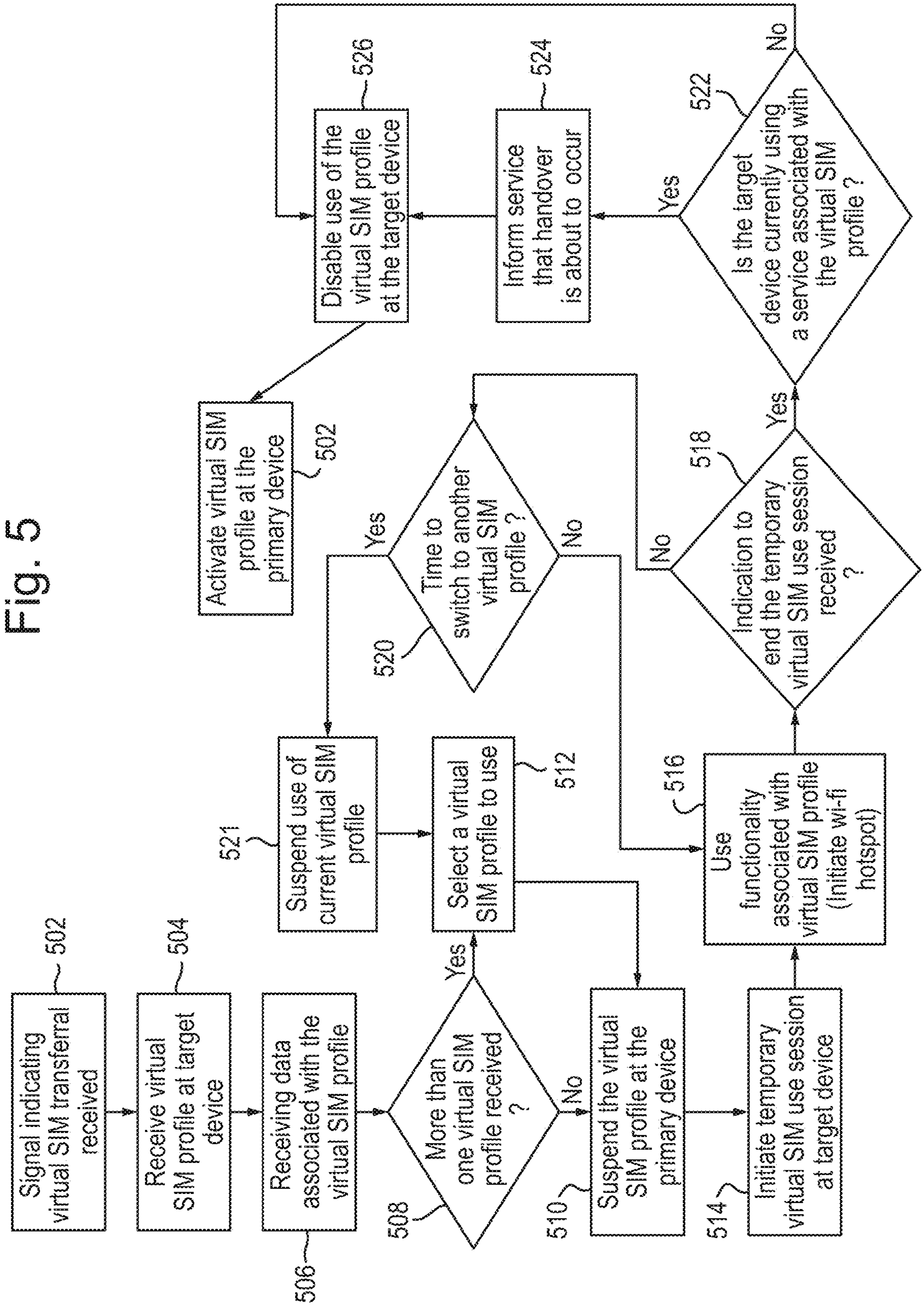
FIG. 5 is a flow chart showing a process for the temporary transferal of a virtual SIM profile to a target device, in accordance with some examples of the disclosure.

FIG. 5 illustrates a process for the temporary transferal of a virtual SIM profile 112 according to an example.

At 502, a signal indicating that a virtual SIM transferal should occur is received. The signal may comprise an indication of a request for use of the virtual SIM profile 112 at a target device 102 (e.g., a vehicle, a smartphone, a tablet, a smart watch, a drone, or a device configured to operate as a wi-fi hotspot), authorization of use of the virtual SIM profile 112 at the target device 102, a low battery status of the primary device 110, or multiple failed attempts to unlock the primary device 110 occurring.

At 504, a virtual SIM profile 112 is received at the target device 102. In some examples, the virtual SIM profile 112 may already be present at the target device 102 (e.g., in a deactivated state).

At 506, data associated with the virtual SIM profile 112 is received. The data may comprise any, or any combination of, contacts, call history, application data associated with a primary device 110, user data associated with the user of a primary device 110, or operating system settings associated with a primary device 110.

At 508, it is determined whether more than one virtual SIM profile 112 has been received (or is present on the target device).

Where it is determined at 508 that only one virtual SIM profile 112 has been received, at 510 the virtual SIM profile 112 is suspended at the primary device 110.

Where it is determined at 508 that a plurality of virtual SIM profiles 112 have been received, at 512 a virtual SIM profile 112 to use is selected. The selection may be based on any, or any combination of, the consistency of coverage of a network carrier associated with the virtual SIM profiles 112 relative to a location of the target device 102, the strength of coverage of a network 108 carrier associated with the virtual SIM profiles 112 relative to a location of the target device 102, a data plan associated with the virtual SIM profiles 112, or a length of a current journey of the target device 102. Then, the process moves to 510.

At 514, a temporary virtual SIM use session is initiated at the target device 102. For example, the selected virtual SIM profile may be installed and/or activated.

At 516, functionality associated with the virtual SIM profile 112 is used at the target device 102. For example, the target device 102 may initiate a Wi-Fi hotspot.

At 518, it is determined whether an indication to end the temporary virtual SIM use session has been received. The indication may comprise any, or any combination of, an expiry of a predefined time period, a received request to end the current virtual SIM use session, a number of calls made using the virtual SIM profile 112 at the target device 102, an incoming call, an incoming text message, or an incoming notification.

Where it is determined that an indication to end the temporary virtual SIM use session has not been received (NO at 518), the process moves to 520, and it is determined whether it is time to switch to another virtual SIM profile 112. Where it is determined that it is time to switch to another virtual SIM profile 112 (YES at 520), the process moves to 521, and use of the current virtual SIM profile is suspended at the target device. The current virtual SIM profile may additionally be reactivated at the primary device. Then, the process moves to 512. Where it is determined that it is not time to switch to another virtual SIM profile 112 (NO at 520), the process moves to 516.

Where it is determined that an indication to end the temporary virtual SIM use session has been received (YES at 518), the process moves to 522, where it is determined whether the device is currently using a service associated with the virtual SIM profile 112. Where it is determined that the target device 102 is currently using a service associated with the virtual SIM profile 112 (YES at 522), at 524 the service is informed that a handover is about to occur.

At 526, the use of the virtual SIM profile 112 is disabled at the target device 102.

Where it is determined that the target device 102 is not currently using a service associated with the virtual SIM profile 112 (NO at 522), the process moves to 526.

At 528, the virtual SIM profile 112 is activated at the primary device 110.

The actions or descriptions of FIG. 5 may be done in any suitable alternative orders or in parallel to further the purposes of this disclosure.

Where reference is made herein to the provision of a virtual SIM profile 112 at a target device 102, it will be appreciated that the same, or some of the same, mechanism which is used to initially provision a virtual SIM profile 112 at a primary device 110 may be used to provision the virtual SIM profile 112 at the target device 102, as is described in relation to FIG. 3.

In some examples, the system for temporarily provisioning a virtual SIM profile may comprise part of the native operating system (OS) (e.g., Android OS, iOS, etc.) of the target device 102, or an application that can be accessed even when the target device 102 (e.g., the mobile phone) is locked. For example, initially, upon selecting an option to temporarily transfer a virtual SIM to the target device 102, the first user may be prompted to share their credentials (e.g., biometric ID, facial ID, voice ID, user ID etc.) through an interface of the target device 102, which may then be verified by a primary authenticator. The primary authenticator may be a device OS provider (e.g., Apple, Google, Samsung, etc.).

Once the user identity (e.g., Apple ID, Google-ID, Samsung ID, etc.) is obtained based on the user credentials, a mobile number associated with the user ID may be obtained by the system. The system may further identify a carrier-ID (e.g., a service provider ID) for the mobile number and initiate a request to temporarily provision the virtual SIM profile on the target device 102 (e.g., a device of the second user, or another device belonging to or associated with the user). As the first user is authenticated, an authentication certificate obtained from the primary authenticator may be sent to the carrier/operator. The carrier/operator may perform its own authentication based on the shared credentials (e.g., biometric ID, facial ID, voice ID, and so on), and upon successful authentication, push the virtual SIM profile 112 to the target device 102. It will be appreciated that any other appropriate means of authentication may be used in order to verify the authorization of the user to transfer their virtual SIM to the target device 102.

As is described above, request for transferal of a virtual SIM profile may be made via an application or via part of a native operating system. For example, the transferal may be initiated based on the selection by the user of an option (e.g., "third-party call") on a locked screen of a device itself as is illustrated in FIG. 6.

Figure 6:
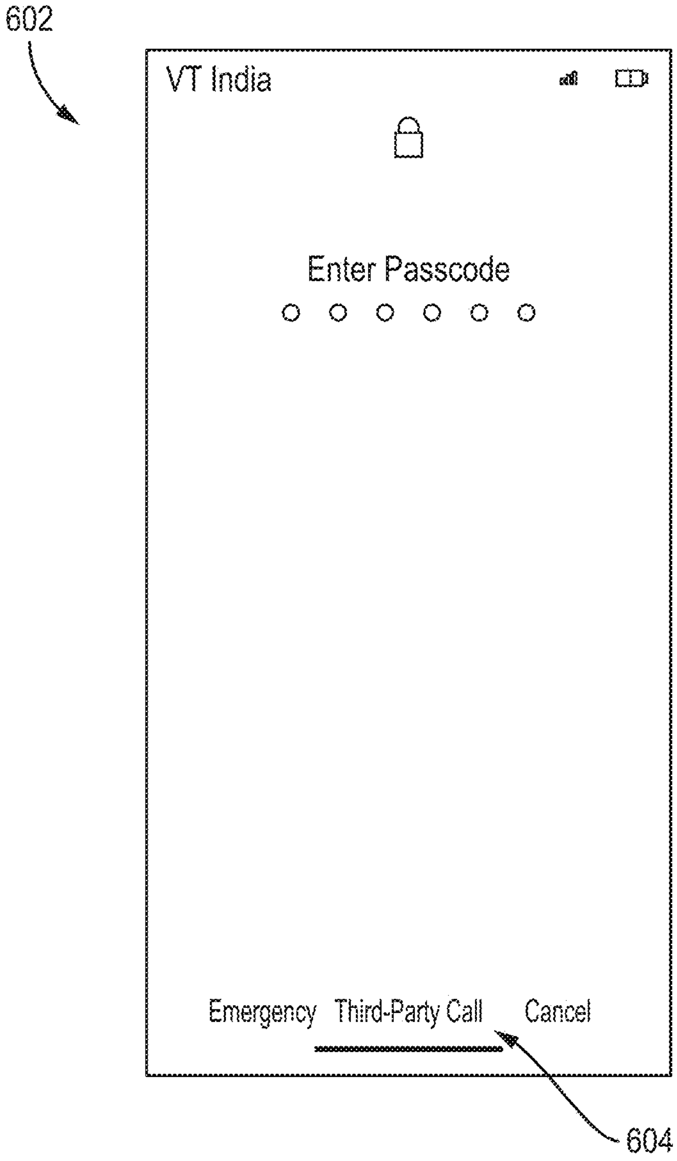
FIG. 6 illustrates an example of a user interface for initiating transferal of a virtual SIM profile to a target device, in accordance with some examples of the disclosure.

FIG. 6 illustrates an example of a user interface for initiating transferal of a virtual SIM profile to a target device. In particular, FIG. 6 illustrates an interface 602 of a target device showing the configuration in which an option to obtain a third-party virtual SIM profile is displayed. In particular, the option is illustrated here as "Third Party Call" 604. Upon selection of the option "Third Party Call" 604, as is described above, the user may be prompted to input their credentials (e.g., a user ID and provide verification information such as a password or fingerprint), such that a virtual SIM profile associated with particular user credentials may be temporarily provisioned at the target device.

While FIG. 6 illustrates an example of a user interface for initiating transfer of a virtual SIM profile at a locked screen of a user interface, it will be appreciated that a user may initiate a transfer in any appropriate way, such as via an application (e.g., a SIM transferal application) downloaded to the device, through an interaction with a notification received from another device, and so on. Furthermore, while this example is illustrated as an interface of the target device, it will be appreciated that the initiation of the transferal of the virtual SIM profile may take place at the primary device, the target device, or via another device.

In some examples, different amounts of data may be transferred along with the virtual SIM profile. For example, in one configuration, only the data of the virtual SIM profile may be transferred (e.g., information required to access a particular network, and in some examples along with any or any combination of contacts of the user, call history, text messages, and so on). In some examples, additional data associated with the user, or the primary device, may be transferred along with the virtual SIM profile. Preconfigured settings, such as settings which may be configured by a user accessing a SIM transfer application, may determine which data is to be transferred. For example, a "lite" version (e.g., a low data version) of user data associated with the virtual SIM profile and contact list may be downloaded to the target device. The Lite version of the user data may include just the username, photo and lite version of the contact list (e.g., without images of each contact). In some cases, an application associated with the virtual SIM profile (e.g., installed on a device from which the virtual SIM profile has been transferred) may additionally be downloaded, for example, based on a user request. A lite version of the user profile may enable the first user to access their contacts and dial a number saved in the contact list at the target device. The user may also access call history (e.g., dialed and received numbers).

In some examples, the additional data received along with the virtual SIM profile may be applications associated with the user, such as applications of the primary device, or applications linked to the user in cloud storage. The additional data may comprise personal data of the user, such as user data stored within the applications, and data history. The additional data may be received from another server (such as a different server than the server providing the virtual SIM profile). For example, a cloud server associated with a user may be used to transfer the data (e.g., user configuration data or user data), and/or indicate applications associated with the user to the target device. The target device may then, for example, download and install the applications (from the cloud server or another source, such as an application store) and enable access for the personal data. Applications which are able to be transferred may be designed to be "fluid" applications (e.g., are available from any device). For example, containerization may be used to deploy such fluid applications. Thus, different types of temporary profile access may be enabled. For example, "basic access" may only enable calling functionality and core apps of the user to be downloaded on the target device with limited personalization. "Advanced access" may additionally enable access to non-core applications and personal data. A user may select which of the types of temporary profile access will be enabled. Alternatively, where, for example, the target device is a device for leasing, the target device provider may determine the type of temporary profile access to be enabled.

In some examples, the methods and systems described herein enable transferal of a virtual SIM from a primary device to a target device by authorizing the transfer at the target device. For example, where a device of a user, such as a mobile phone of a user having a virtual SIM, is lost or if the battery of the personal mobile phone is drained, so that the user is no longer able to utilize the virtual SIM via the device of the user (e.g., a primary device), the first user can borrow a (target) device such as a mobile phone from another user (e.g., a second user), transfer the virtual SIM to the target device, and use the functionalities associated with the virtual SIM, for example, using the virtual SIM to make a call. Advantageously, this enables the second user to share the use of their device without relinquishing access to the first user of the data available within their unlocked device. Furthermore, as the first user is able to make calls using their own virtual SIM profile, and thus, their own mobile number, the user to whom the call is made will receive a caller ID corresponding to the virtual SIM of the first user, rather than corresponding to the virtual SIM of the mobile device through which the call is made. Thus, the recipient of the call will be aware that the first user was attempting to contact them, and may be more inclined to answer the call if the user is a user that they are familiar with, rather than screening the call if it comes from a number unknown to the recipient. In a further example, the systems and methods herein may facilitate sampling of a device, where a user may temporarily transfer their virtual SIM profile from their primary device (e.g., smartphone) to a device which they are considering purchasing, so that the user is able to check the quality and user experience of the device.

For example, a first user may wish to access functionality associated with a virtual SIM currently associated with a primary device of the first user. The user may therefore access an application or part of the operating system at a second device (e.g., a target device, belonging to the first user or another user) for SIM transferal. The user may select, via the application or system, an option to make a third-party call using a different virtual SIM profile. The system running on the target device may then request from the first user their credentials (e.g., a biometric authentication credential, such as biometric ID, facial ID, voice ID, or any other sort of authentication, such as user ID, password etc.) and verify the identity of the first user using a first authentication server, which may be a server of the mobile OS provider. The system may also receive a carrier ID along with a subscription manager discovery server (SM-DS) address from the first authentication server. The system may send the authentication token from the target device to the operator for downloading the profile of the first user. The carrier/operator may trust the authentication token issued by the first authentication server or perform a separate user authentication. The subscription manager discovery server may check whether the virtual SIM profile associated with the first user is active on another device (e.g., a primary device). If the virtual SIM profile is active on another device, the subscription manager discovery server may send virtual SIM profile suspension request to the other device and temporarily disable all cellular services for the first user on the other device. The virtual SIM profile of the second user at the target device is also temporarily suspended so that the first user's profile may be pushed to the device, if there are limited virtual SIM profile slots available on target device. The virtual SIM profile of the second user may also be suspended for privacy and security reasons. The subscription manager discovery server may then push the virtual SIM profile (e.g., operator data and subscriber data) of the first user to the device of the second user based on the received authentication token and/or based on the result of its own authentication. The target device of the second user can then download the virtual SIM profile as well as other data (e.g., recently dialed number, important contact list, fluid app, etc.) based on pre-configured settings. In an example, the first user or the second user may provide a time limit for which the virtual SIM profile of the first user is to be configured at the target device. On expiry of the time limit or upon meeting certain preconfigured criteria, data consumption limit, number of incoming/outgoing call limit, etc.), the carrier (e.g., the subscription manager discovery server) may send virtual SIM profile suspension or profile deletion request to target device.

Once the virtual SIM profile has been suspended or deleted at the target device, the virtual SIM profile of the primary device is re-activated. In some examples, once the usage of the virtual SIM profile at the first device is concluded (by virtue of the user ending the session, or the session ending due to the fulfilment of preconditions as discussed above) the first user's virtual SIM profile may be deleted from the second user's device and re-provisioned on their primary device. For example, when the first user no longer requires use of the target device, it may be undesirable to leave any call history or other user data on the target device. Thus, the first user's privacy may be preserved in respect of data associated with the virtual SIM profile.

It will be appreciated that, in some examples, a virtual SIM profile (corresponding to an active mobile number) may not be configured on more than one device at any given time for security reasons as well as for efficient call routing.

Figure 7:
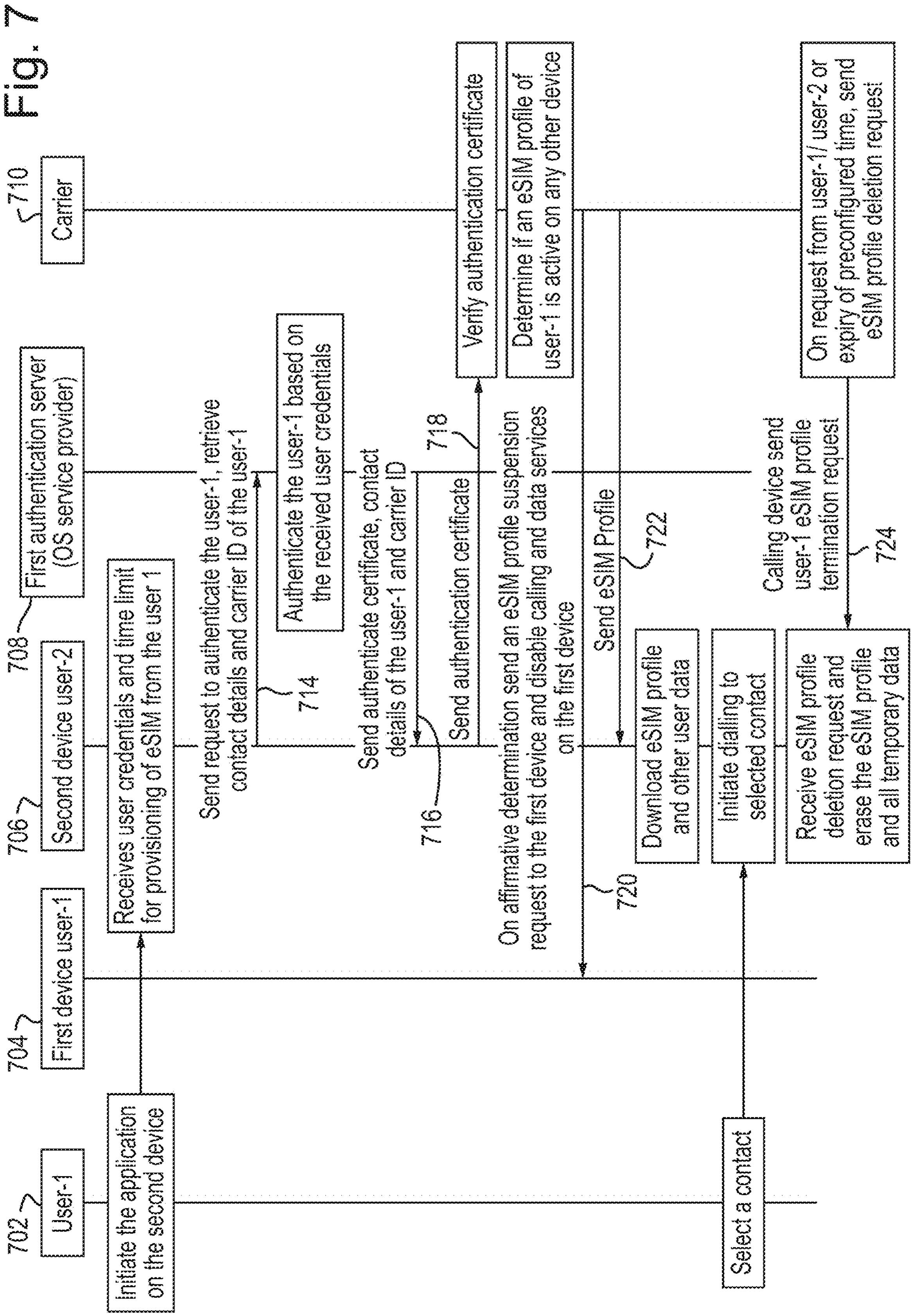
FIG. 7 is a flowchart representing a process for the temporary transferal of a virtual SIM profile to a target device, in accordance with some examples of the disclosure.

FIG. 7 illustrates the process for the temporary transferal of a virtual SIM from a first device (primary device) associated with a first user, to a second device (target device) associated with a second user. In particular, FIG. 7 illustrates a system 700 comprising a first user 702, a first user device 704, a second user device 706, a first authentication server 708, and a carrier 710.

The first user 702 initiates an application for the transferal of virtual SIMs at the second user device 706 belonging to, or associated with, a second user. The second device 706 receives user credentials and a time limit for the provisioning of the virtual SIM 712 by virtual of the first user 702 interacting with the second device 706.

Then, a request message 714 is sent from the second device 706 to a first authentication server 708 (for example, an operating service provider), where the request is to authenticate the first user 702, and retrieve contact details and a carrier identifier (ID) of the first user 702. The first authentication server 708 then authenticates the first user 702 based on the received user credentials.

Then, the first authentication server 708 sends, to the second device 706, a message 716 comprising an authentication certificate, contact details of the first user 702 and the carrier ID. In response, the second device 706 sends a message 718 comprising the authentication certificate to the carrier 710.

The carrier 710 then verifies the authentication certificate, and in response to verification of the authentication certificate, determines if a virtual SIM profile of the first user 702 is active on any other device. In this case, the same virtual SIM profile as the one requested to be transferred is active on the first device 704. The carrier 710 then sends a virtual SIM suspension request message 720 to the first device 704 and disables calling and data services of the first device 704. The carrier 710 also sends the virtual SIM profile 722 to the second device 706.

The second device 706 then downloads the virtual SIM profile and user data associated with the virtual SIM profile (e.g., associated with the first user 702). At this stage, use of the virtual SIM profile may be initiated at the second device. For example, the use of the carrier may be enabled at the second device.

The first user 702 then selects a contact from among contacts downloaded onto the second device 706 and initiates a call to that contact, where the second device 706 then initiates calling to the selected contact.

The virtual SIM profile continues to be available at the second device 706 until authorization for use of the virtual SIM profile ends. For example, the authorization may end upon request from a user of the first device 704 or a user of the second device 706, and/or upon expiry of a predetermined time period, and so on. Once the authorization has ended, the carrier 710 may send a virtual SIM profile deletion or suspension request 724 to the second device 706. Upon reception of the request 724, the second device 706 in this example erases the virtual SIM profile and any data associated with the virtual SIM profile (for example, temporary data).

In some examples, a user may temporarily provision virtual SIM profile on any device that supports a virtual SIM slot for enabling the use of functionality associated with the virtual SIM profile, such as enabling a voice call or using data services. To protect misuse of subscribed cellular or data services associated with the virtual SIM profile (mobile number) on the target device, the user may determine conditions for use of the virtual SIM profile. For example, the user may set for how long the virtual SIM profile may be provisioned on target device. Similarly, the first user may wish to define how much data can be consumed using the target device or how many calls can be initiated from the target device. On successful authentication of the first user, the virtual SIM profile can be provisioned on the target device based on the preset conditions or configuration. When such requests are initiated on the target device, the server may send a notification to the primary device where the virtual SIM profile may be active, in order to seek specific permission for use of the virtual SIM. The conditions for use of the virtual SIM profile at the target device may be set at the primary device in response to receiving the request to transfer, or may be preset. In other examples, the conditions may be set at the target device, where the conditions are sent to the primary device for approval. The virtual SIM profile may only be configured at the target device when the user approves the request on the primary device. Upon expiry of the conditions for use of the virtual SIM profile, such as a predefined time period for use of the virtual SIM at the target device, or after reaching the defined data limit, or reaching the number of calls, the virtual SIM profile may be removed from or suspended at the target device and provisioned back on the primary device.

Figure 8:
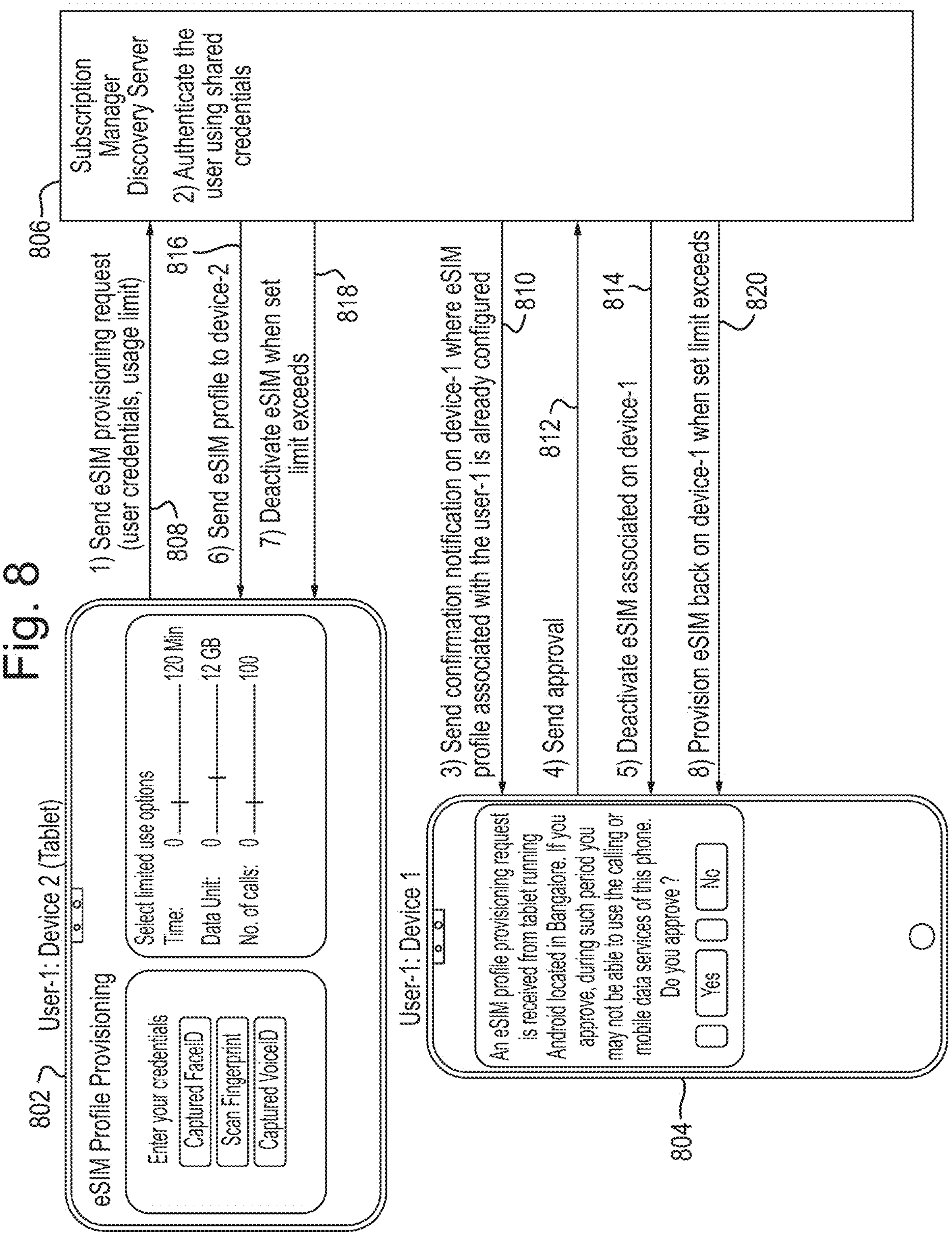
FIG. 8 illustrates a system for temporarily provisioning a virtual SIM at a target device in response to a request sent from the target device, in accordance with some examples of the disclosure.

FIG. 8 illustrates an example of a system 800 for temporarily provisioning a virtual SIM at a second device 802 in response to a request sent from the second device 802. The system further comprises a first (primary) device 804 and a subscription manager discovery server 806.

At the second (target) device 802, a user requests a virtual SIM transfer, by entering into a user interface of the second device 802 user credentials, such as face ID, a fingerprint, or a voice clip. In addition, in this example, the user also inputs parameters for the length of time for which the virtual SIM can be transferred, a data limit usage of the virtual SIM while transferred, and a limit on the number of calls that can be made while the virtual SIM is transferred. A provisioning request 808 is then sent from the second device 802 to the subscription manager discovery server 806. As is described above, the subscription manager discovery server 806 may then authenticate the user using shared credentials.

The subscription manager discovery server 806 the sends, to the first device 804 (on which the virtual SIM is currently configured), a confirmation notification 810, which may be output to a user interface of the first device 804. As is illustrated in this example, the confirmation notification may request permission to transfer the virtual SIM to the second device 802 (and in this example, explain that the functionality associated with the virtual SIM will be unavailable while the virtual SIM is usable at the second device 802).

Where a user approves the transfer of the virtual SIM (e.g., by interacting with the user interface of the first device) an approval message 812 is sent from the first device 804 to the subscription manager discovery server 806. The subscription manager discovery server 806 then sends a deactivation message 814 indicating that functionalities of the virtual SIM profile are to be deactivated for the first device 804. Then, the subscription manager discovery server 806 sends, to the second device 802, the virtual SIM profile 816. The second device 802 then utilizes functionalities associated with the virtual SIM profile.

Once at least one of the parameters initially set at the second user device 802 has been exceeded, the subscription manager discovery server 806 deactivates the functionality associated with the virtual SIM for the second device 802, and sends a message to the second device indicating that the functionalities associated with the virtual SIM profile have been deactivated. The second device 802 then deletes, or suspends, the virtual SIM profile. Then, the subscription manager discovery server sends to the first device 804 a provisioning message 820 provisioning the virtual SIM at the first device.

In some examples, the methods and systems described herein enable verification of a user in order to complete a transaction (e.g., a banking transaction, access to office resources, and so on), at a secondary (target) device of the user, or at a device which is not associated with the user. For example, a user may verify their identity by sending a message to a particular mobile number associated with the user. For example, when a user requires their identity to be verified, security systems may send a one-time password (OTP) to the user's registered number. If the primary device equipped with the virtual SIM profile corresponding to the registered number is unavailable to the user (e.g., is lost or drained), the user would be unable to receive the OTP and authentication will fail. In such cases, according to the examples herein, the user may temporarily configure their mobile number on another device by virtual of transferal of the virtual SIM profile corresponding to that number in order to receive the OTP. In some examples, rather than transferring the virtual SIM profile to a device of the second user, a user may choose to provision their virtual SIM profile on any device accessible to the user or any connected device having a virtual SIM slot with capability to capture user credentials.

In some examples, a user who wishes to configure a virtual SIM profile on a connected device to receive an SMS may initiate a virtual SIM profile configuration request from any connected device (e.g., a mobile of their friend). The authentication and provisioning process may be enabled as is described in relation to FIG. 7 above. In this case, the user may specifically choose to provision the virtual SIM profile just to receive SMS, another in-app code or message and/or receive a call. More granular options can be provided. For example, an option may be provided to the user to temporarily provision the virtual SIM profile on a device only for receiving an OTP to complete a financial transaction. The virtual SIM profile may then be provisioned only for the designated purpose. As soon as the purpose is served, the borrowed virtual SIM profile may be automatically deleted. Then, the virtual SIM profiles of the primary device from which the virtual SIM profile was borrowed, and the virtual SIM profile which has been suspended on the device to which the virtual SIM profile has been transferred, can be restored. For example, prior to provisioning and/or activating a virtual SIM profile on a target device, the system may suspend the virtual SIM profile on the primary device and on completion of the said purpose activate the virtual SIM profile back on the primary device.

Figure 9:
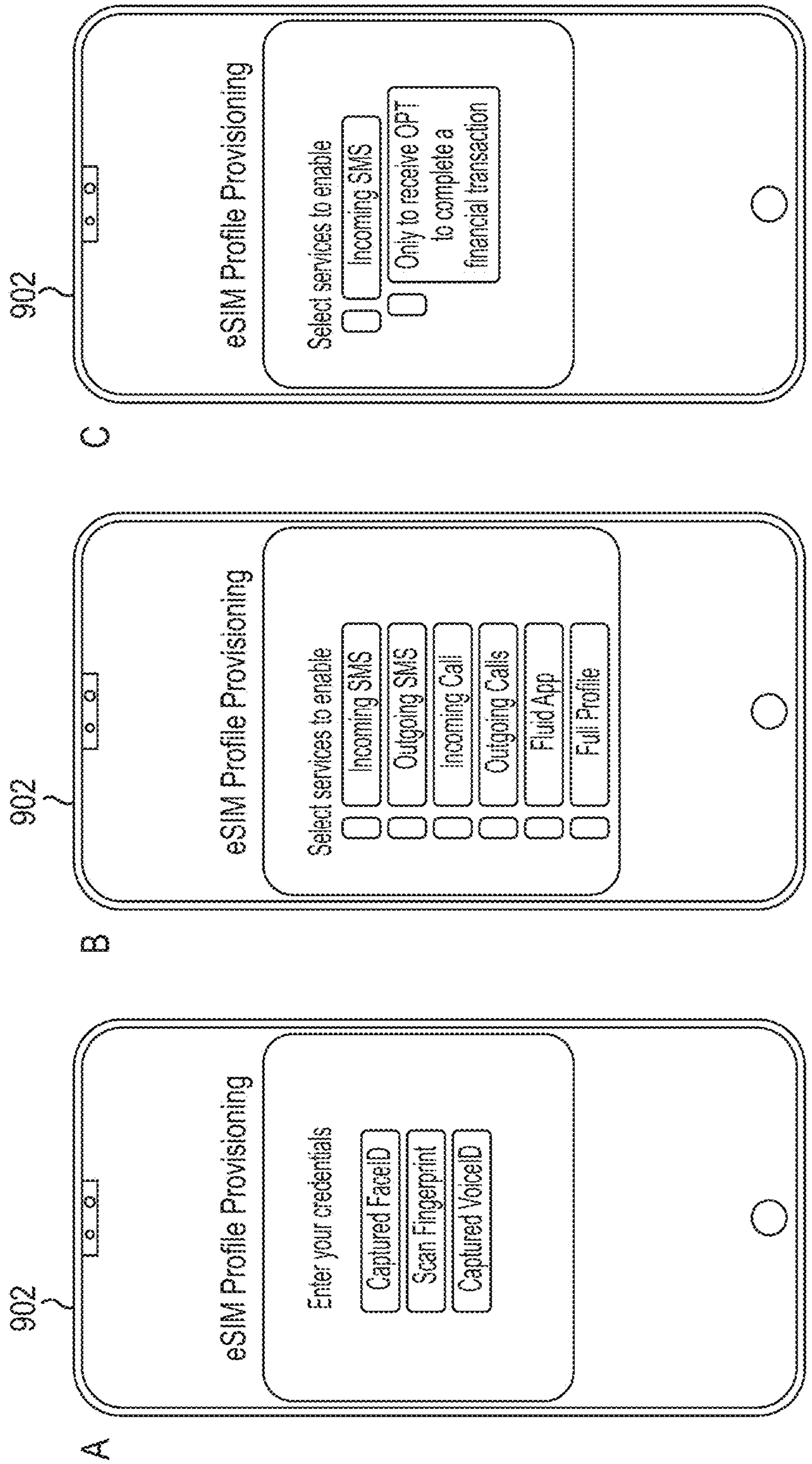
FIG. 9 illustrates an interface of the second device for selecting functionality of the virtual SIM profile to be enabled, in accordance with some examples of the disclosure.

FIG. 9 illustrates an example of temporary virtual SIM provisioning at a second device 902, such as the second device shown in FIG. 7. In particular, FIG. 9 illustrates an interface of the second device 902, such as a graphical user interface, where a user may select from various options to only enable particular functionality associated with the virtual SIM profile to be enabled.

As is shown in FIG. 9A, in a first step, a user is prompted to enter their credentials. As is illustrated here, some options for entering credentials may include capturing an image of the user's face, scanning a fingerprint of the user, or capturing a voice clip of the user. It will be appreciated that any such biometric authentication process may be used in order to verify the identity of the user, or any other authentication methods, such as multi-factor authentication, password-based authentication, and so on.

Once the user is authenticated, e.g., by having presented their credentials, at FIG. 9B, the user may then select the services that they wish to enable at the second device 902. In this example, the options that the user may select from comprise incoming SMS messages, outgoing SMS messages, incoming calls, outgoing calls, an application for controlling the transfer of virtual sims, and a full user profile. Any other appropriate options may be presented to the user. For example, FIG. 9C illustrates an alternative set of more limited options from which the user may select, which includes enabling the receiving of incoming SMS messages, or an option to only receive OPT to complete a financial transaction.

In some examples, the methods and systems described herein enable transferal of a virtual SIM profile, and a mobile number associated with the virtual SIM profile, from one device to another device. In particular, the mobile number may be transferred in a service environment, for example, based on a business requirement of a service group (e.g., red cross society, local administration, etc.). For example, a mobile phone number is often associated with the identity of a particular user, but in other cases a phone number may be associated with a group of people, such as a service group. It is common in some work environments to have a mobile phone for receiving incoming help requests, where when the work shift changes, one colleague hands over the physical mobile phone to another colleague. Handing over a physical device may be inefficient. For example, the earlier call handler may have to visit the next call handler and handover the device. By enabling temporary transfer of a virtual SIM, and therefore number, enabling call handlers to utilize the same virtual SIM profile without requiring everyone to carry a SIM connected to the same number, efficiency of device usage is improved, and further, hardware wastage is reduced (e.g., as each person does not need to be provisioned with a dedicated phone within a particular organization, where their personal device may instead be provisioned with the virtual SIM profile).

For example, a user may access an application on a device for enabling temporary provisioning of a mobile number on a calling device. To request temporary provisioning of a profile associated with a mobile number on a personal calling device, the application may ask the user to enter the mobile number and the user credentials. The application may determine a carrier/service provider associated with the mobile number and may send the user credential to the profile provisioning server of the carrier. The carrier server may authenticate the user based on preconfigured profile responsible to handle calls for the present shift. The carrier server may have received the profile of a user responsible to handle calls at the present shift in advance or by handover request initiated by an earlier call handler. On successful authentication of the user, the carrier server may send the profile associated with the mobile number of the user's device.

Figure 10:
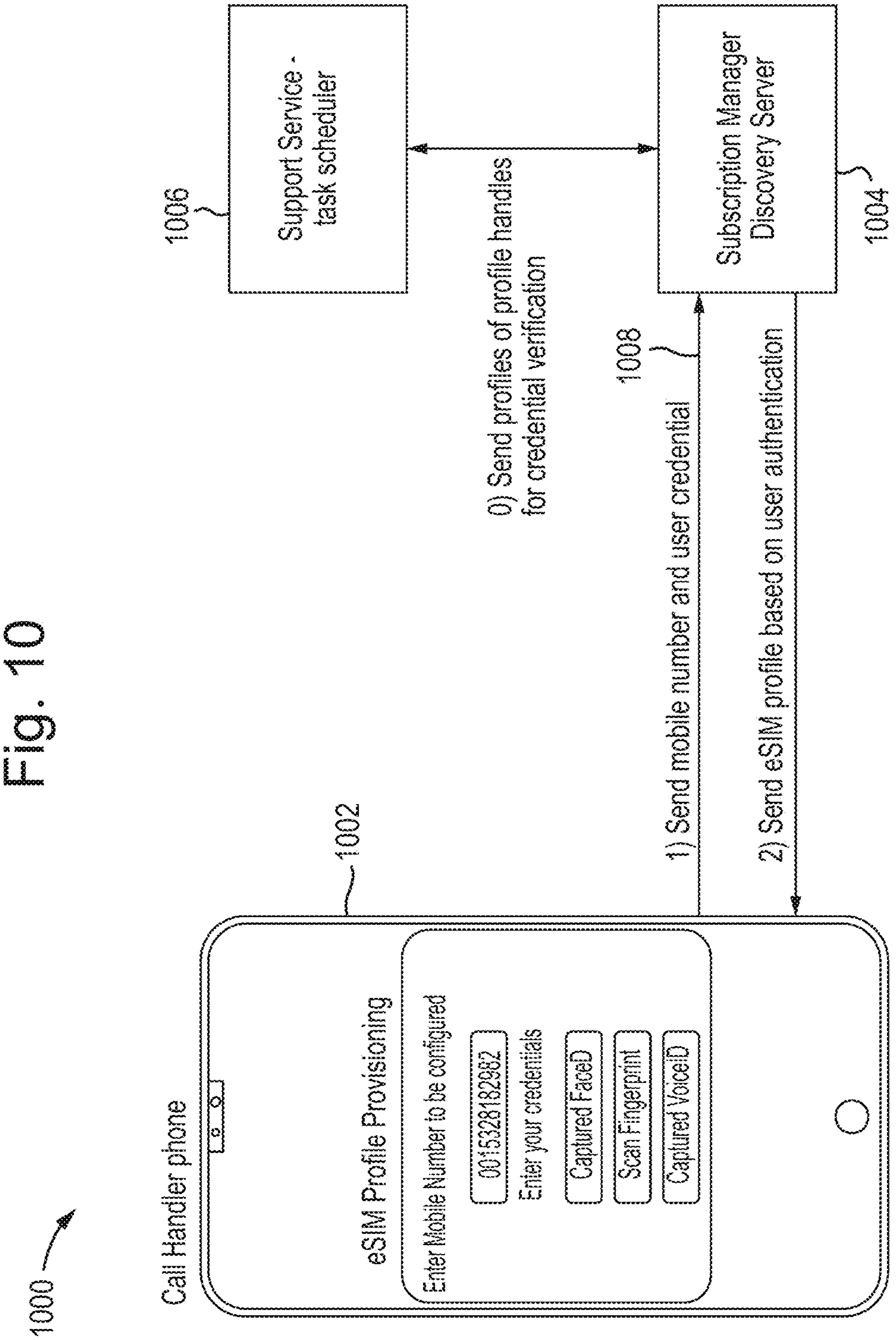
FIG. 10 illustrates a system for temporary provisioning a virtual SIM profile at a target device, in accordance with some examples of the disclosure.

FIG. 10 illustrates an example of a system 1000 for temporary virtual SIM provisioning at a second device 902, such as the device shown in FIG. 7. In particular, FIG. 10 illustrates an interface of the second device 902, such as a graphical user interface, along with a subscription manager discover server 1004 and a support service 1006 (e.g., task scheduler). The process of FIG. 10 may be particularly beneficial for a group of users operating using the same mobile number, such as a service group having one number.

In this example, a user is prompted to enter the mobile number associated with the virtual SIM profile that they wish to transfer to the second device 1002. The user is also prompted to enter credentials to verify their identity, such as through the user of capturing an image of the user's face, scanning a fingerprint of the user, or capturing a voice clip of the user.

Once the user is authenticated and has entered the mobile number associated with the virtual SIM profile they wish to transfer, the mobile number and user credentials are sent to the subscription manager discovery server 1004 (e.g. of the carrier associated with the mobile number). The subscription manager discovery server may request from the support service (task scheduler) 1006 user profiles of profile handlers for credential verification, which may comprise data linking the mobile number to the user credentials (the requesting of user profiles may occur prior to the reception of the mobile number and user credentials, or may occur after, such as in response to a request for the user profile sent from the subscription manager discovery server 1004 sent in response to the subscription manager discovery server 1004 receiving the mobile number and user credentials).

Once the subscription manager discovery server 1004 has authenticated the user based on the received user profile, the carrier server may send the virtual SIM profile associated with the mobile number to the second user device.

Figure 11:
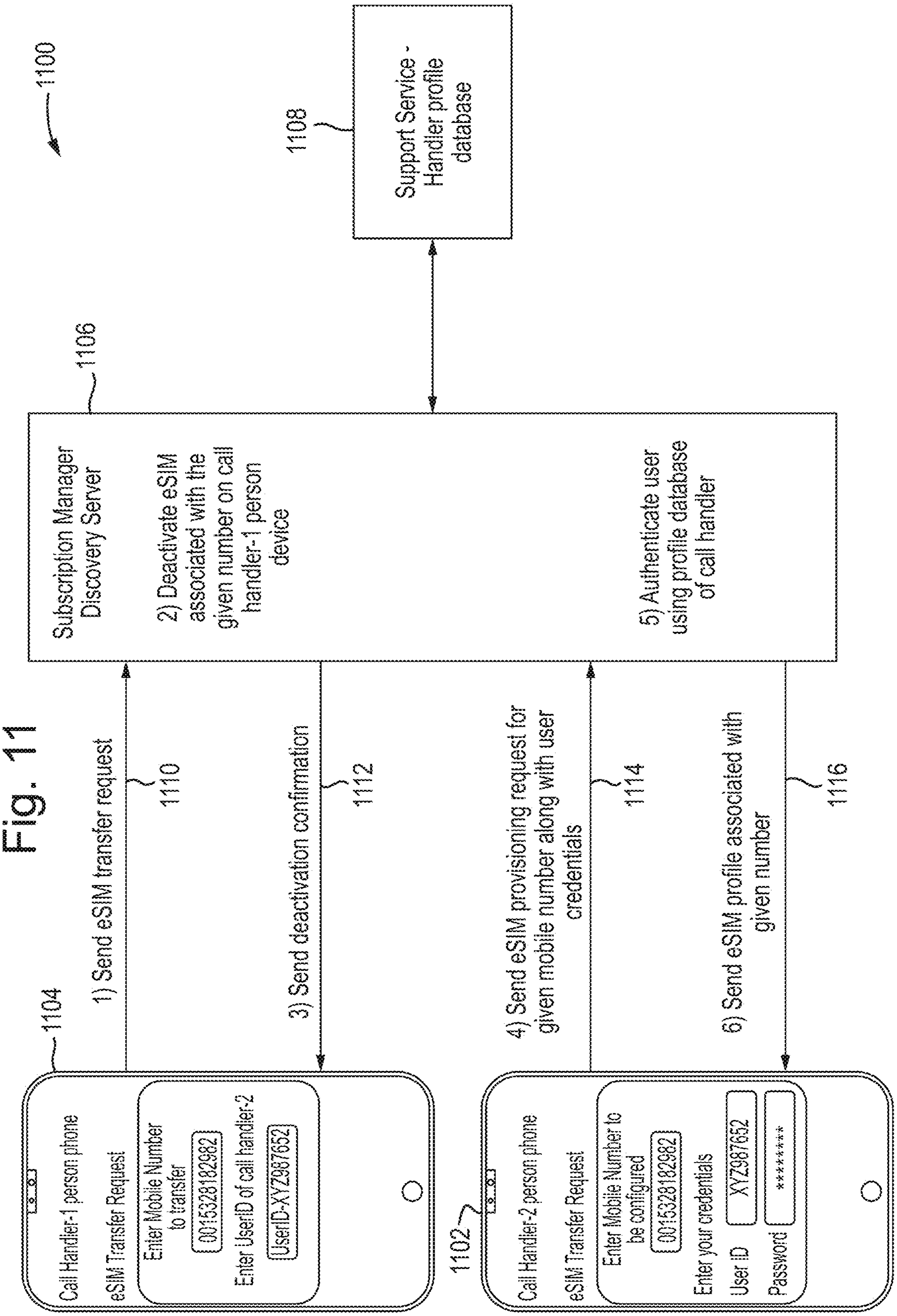
FIG. 11 illustrates a system for temporary provisioning a virtual SIM profile at a target device while deactivating the virtual SIM profile at a primary device, in accordance with some examples of the disclosure.

In some examples, the virtual SIM profile may be deactivated at the first (primary) device prior to the transfer of the virtual SIM profile to the second device. FIG. 11 illustrates an example of a system 1100 for temporarily provisioning a virtual SIM at a second (target) device 1102 while deactivating the virtual SIM at a first (primary) device 1104. The system further comprises a subscription manager discovery server 1106 and a support service 1108 (handler profile database).

At the first device 1104, a first user (e.g., a first call handler) requests a virtual SIM transfer, by entering into a user interface of the first device a mobile number to be transferred, and the user ID of the user to whom the virtual SIM profile should be transferred (e.g., a second user, or second call handler). The first device 1104 then sends the virtual SIM transfer request 1110 to the subscription manager discovery server 1106. The subscription manager discovery server 1106 then deactivates the virtual SIM profile associated with the given mobile number for the first device 1104, and sends a deactivation confirmation 1112 to the first device 1104.

The second user then requests a virtual SIM profile corresponding to the mobile phone number by entering the mobile phone number and their credentials (in this example, their user ID and password) into a user interface of the second device 1102. The second device 1102 then sends the provisioning request 1114 for the given mobile number along with the user credentials to the subscription manager discovery server 1106.

Then, the user is authenticated using a profile database of users (e.g., by accessing the support service-handler profile database 1108). Once the user is authenticated, the subscription manager discovery server 1106 then sends the virtual SIM profile associated with the given mobile number 1116 to the second device 1102.

A primary authenticator may or may not store users' biometric information in a cloud service. As an alternative to the user's biometric being verified by the primary authenticator, the system may allow the user to directly enter their OS provider login or mobile number and a preconfigured verification code (such as a PIN or password). The user may also have to answer other security questions for authentication. The application of native OS may determine, for a given number, the carrier to which the authentication and virtual SIM provisioning request needs to be sent. On receiving the mobile number and associated user verification code, the carrier can authenticate the user and send the link to download the virtual SIM profile.

Figure 12:
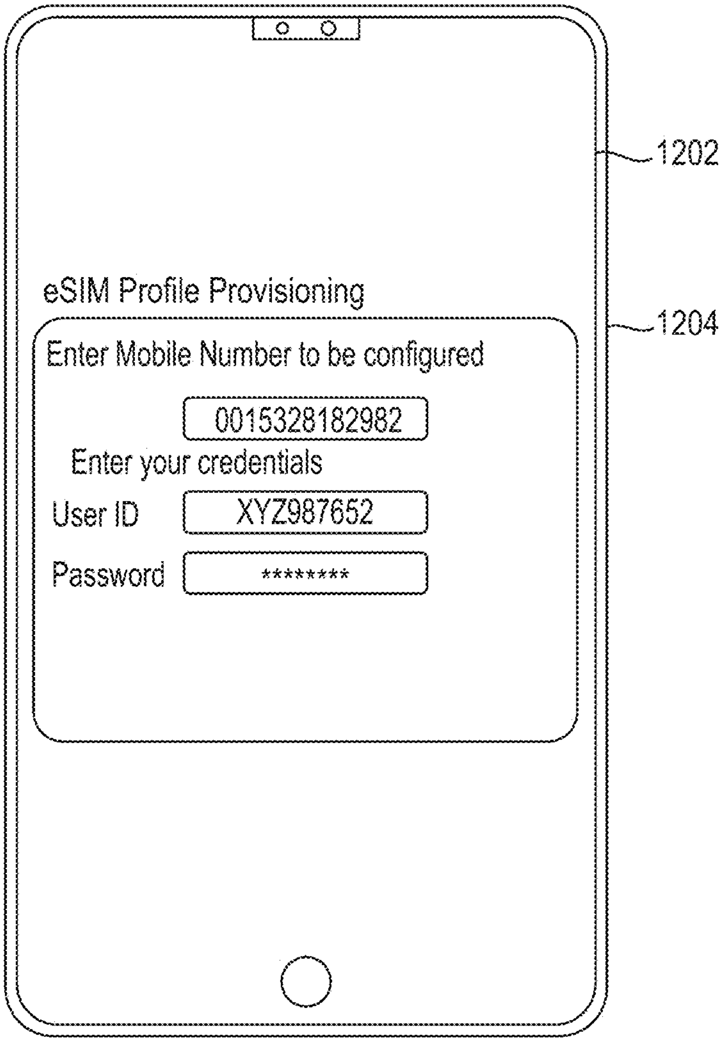
FIG. 12 illustrates an interface for temporary provisioning of a virtual SIM profile, in accordance with some examples of the disclosure.

FIG. 12 illustrates an example of an interface for temporary provisioning of a virtual SIM profile. In particular, FIG. 12 illustrates an interface 1202 of a device 1204 on which the user would like to provision a virtual SIM profile currently associated with a different device. In order to transfer the virtual SIM profile, once an application configured to provision SIMs has been accessed, the user may enter the mobile number associated with the virtual SIM that the user wishes to transfer, along with a user ID and a password associated with the user. In this way, as is described above, a server which is in communication with the device may be capable of determining whether the user is authorized to transfer the virtual SIM profile (e.g., by determining that the user is the user of the device at which the virtual SIM is currently configured), where the server may then authenticate the user and send to the device currently used by the user the virtual SIM associated with the user's other device.

In some examples, a further layer of security may be implemented. In particular, a carrier may enable the temporary provision of the virtual SIM profile on a target device only when the carrier has received a triggering signal from the primary device. These signals may be, for example, an authentication signal authenticating the transferal of a virtual SIM profile from the primary device, an indication that the battery of a primary virtual SIM holding device is going to be drained, an indication that multiple failed attempts have been made to access the primary virtual SIM holding device (such as in a case where the primary device has been stolen), or where the mobile number is assigned to a business, where the business may implement a manual configuration to transfer the virtual SIM profile from one device to another, such that the number associated with the business is transferrable between persons involved in the business.

In the examples above, generally the examples are explained with respect to private device use, such as the transferal of a virtual SIM profile between devices belonging to the same user, or another user, such as a friend or relative. It will be appreciated that these examples are equally applicable to a device obtained on commercial terms (e.g., as a short-term rental/lease). For example, a virtual SIM profile associated with a user may be provisioned on a temporary device which a user has obtained for rent separately from a vendor, or as part of the available bundle, e.g., in an office, hotel/restaurant, or during air travel. The use of the virtual SIM profile at the temporary device may be terminated, or revoked, when the contract for use of the temporary device is terminated.

In some examples, the target device may be a device such as a vehicle (e.g., a car). It will be appreciated that some vehicles may comprise their own virtual SIM profile, and/or may be configured so that they are able to receive virtual SIM profiles.

In such a configuration, users of the vehicle (such as passengers and drivers) may temporarily share their virtual SIM profile with the vehicle. For example, a plurality of users of the vehicle may share their virtual SIM profile, for example of their respective primary devices such as smartphones, with the vehicle, in the manners described above. While the vehicle may or may not have an active virtual SIM profile, the vehicle may have the ability to communicate with a mobile network or server to initiate the sharing/authentication process of the virtual SIM profiles. In particular, the vehicle may send a prompt (for example using a Bluetooth connection or the like) to at least one user of the vehicle to share their virtual SIM profile, where the user(s) may approve or deny use of their virtual SIM profile. In another example, the user may initiate the sharing of their virtual SIM profile with the vehicle. For example, primary devices may initiate the process directly with the mobile network using the car's EID (Embedded Identity Document). In another example, the automatic provisioning of the virtual SIM profile at the vehicle can be initiated in response to detecting that the phone is going offline or is offline (e.g., dead battery).

As is described above, in one example, the vehicle may select from among a plurality of virtual SIM profiles, a virtual SIM profile to use during the virtual SIM use session at the vehicle. For example, the selection of a virtual SIM profile for use may be based on the length of a current journey of the vehicle, for example obtained from the navigation system of the vehicle, whereby each virtual SIM profile may be used for the same amount of time during the journey. This may enable services (e.g., video/audio streaming) utilizing mobile data to utilize all registered virtual SIM profiles. The usage of the virtual SIM profiles may additionally or alternatively depend on the mobile operator with which each virtual SIM profile is registered. For example, some mobile operators have better coverage, and/or signal strength in some geographical areas than others, and the selection of a virtual SIM profile to utilize may be based on such data (or any other metadata).

The vehicle may switch between virtual SIM profiles, whereby the use of each virtual SIM profile may correspond to a respective temporary virtual SIM use session. For example, a virtual SIM profile management system of the vehicle may continuously or periodically assess whether the current virtual SIM profile is the best profile to use, for example, based on current signal coverage, current signal strength, amount of data on a data subscription plan associated with the virtual SIM profile, and so on. The virtual SIM profiles which are not in use may be suspended at the vehicle, and in some cases, reactivated at the relevant primary device while not in use. Therefore, the vehicle may enable users whose virtual SIM profile is not in use to use their virtual SIM profile at their primary device (e.g., until the vehicle switches to that virtual SIM profile). Once it is determined that the target device (e.g., vehicle) is no longer in use (e.g., once the journey has ended, or the vehicle is switched off, or the users exit the vehicle), the vehicle may delete the virtual SIM profiles. In some examples, e.g., where the users of the vehicle are regular users, the vehicle may store (in suspension) the virtual SIM profiles of those users so that it is not necessary to download them each time the users enter the vehicle (although functionality of the virtual SIM profiles may be disabled between use).

Figure 13:
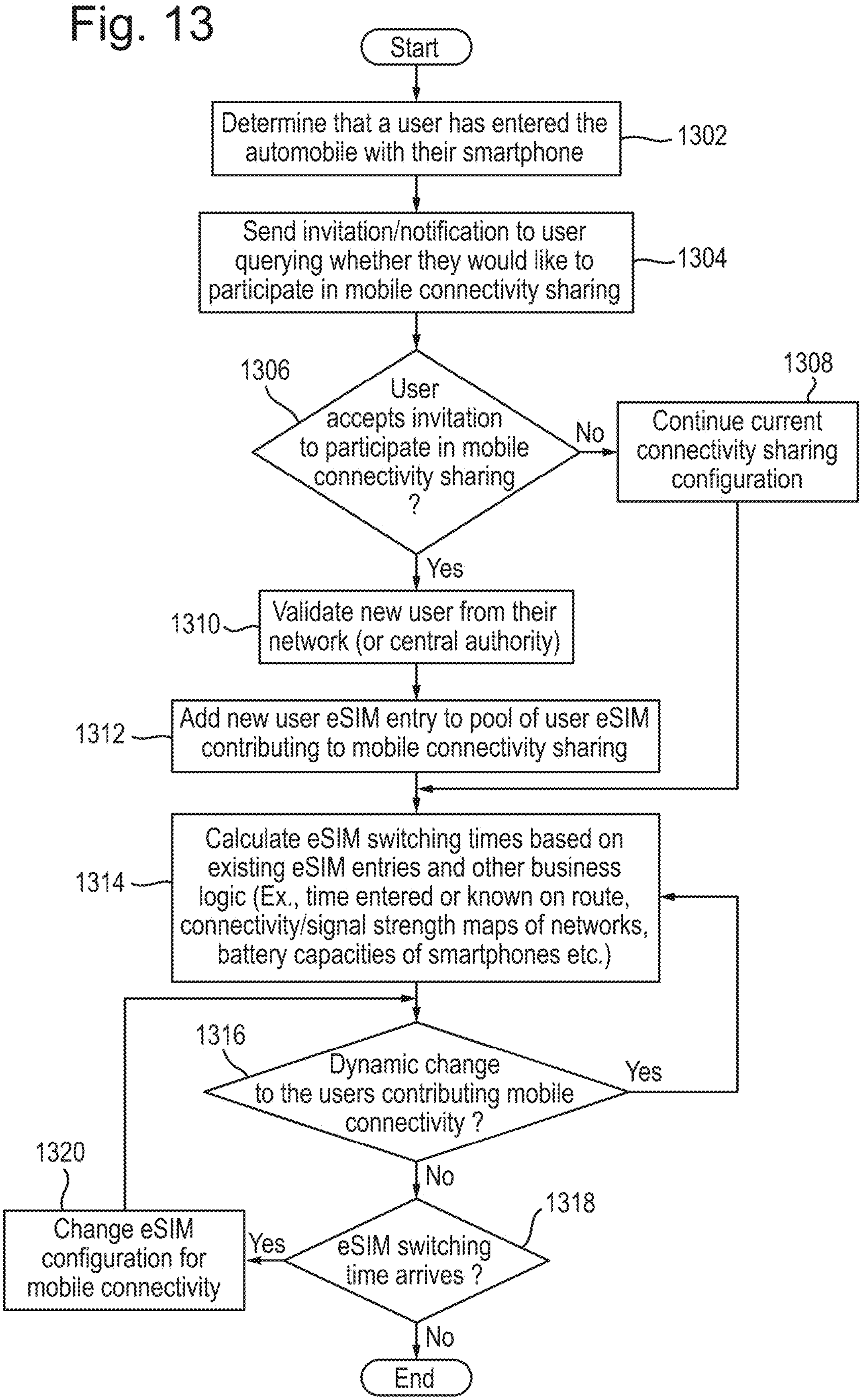
FIG. 13 is a flow chart showing a process for transferring a virtual SIM profile from primary devices to a vehicle, in accordance with some examples of the disclosure.

FIG. 13 illustrates an example of a process for transferring a virtual SIM profile from primary devices to a vehicle.

At 1302, it is determined that a user has entered a vehicle with a device (primary device), such as a smartphone. For example, a vehicle may detect a smartphone which is present within the vehicle by any suitable means, such as through a Bluetooth signal, an NFC sensor, and so on.

At 1304, a notification (e.g., an invitation) is sent to the primary device from the vehicle querying whether they would like to participate in mobile connectivity sharing.

At 1306, it is determined whether the user accepts the invitation to participate in mobile connectivity sharing. Where the user does not accept the invitation (NO at 1306), at 1308 the current mobile connectivity sharing configuration of the vehicle is maintained, and the process moves to 1314.

Where the user accepts the invitation (YES at 1306), the process moves to 1310, and the new use is validated by the network with which the primary device is associated, or by a central authority (e.g., an authentication server).

At 1312, the new virtual SIM profile is added to a pool of virtual SIM profiles, which may comprise additional virtual SIM profiles.

At 1314, virtual SIM profile switching times are calculated based on the plurality of virtual SIM profiles and any other preconfigured requirements (e.g., the calculation may be based on any or any combination of a time entered, time to completion of a current route, signal strength map, signal coverage map, battery capacity of the devices, and so on).

At 1316, it is determined whether there is a dynamic change to the users contributing mobile connectivity (e.g., whether any additional virtual SIM profiles have been added). Where it is determined that there is a change to the users contributing mobile connectivity (YES at 1316), the process moves back to 1314.

Where it is determined that there is not a change to the users contributing mobile connectivity (NO at 1316), it is determined at 1318 whether it is time to switch virtual SIM profiles. Where it is determined that it is not time to switch virtual SIM profiles (NO at 1318), the process ends.

Where it is determined that it is time to switch virtual SIM profiles (YES at 1318), a different virtual SIM profile is selected for mobile connectivity. Then, the process moves back to 1316.

In some examples, a handoff or switch from one virtual SIM profile to another (e.g., a change in temporary virtual SIM use session) may result in a notification being sent to the streaming service indicating that a switch is about to occur, or is occurring. This may enable the streaming service to prefetch additional content to support switching data network connections so that the client does not experience a buffer underrun. Similarly, in addition to, or instead of, any of the considerations outlined above, the virtual SIM profile manager system may make switching decisions based on current buffer threshold, length of trip, known dead spots for particular mobile operator, or data caps associated with the plans including the availability of premium data (e.g., no data speeds constraints, and so on). A media player of the vehicle (e.g., video, music) may also make streaming decisions based on such information. Thus, a number of breaks in service provision may be reduced.

In one example, the virtual SIM profile may be deactivated at the vehicle and re-activated on a primary device (e.g., a user's phone where it is installed and normally used) based on a phone call (or text, notification, and so on) being received using the virtual SIM profile. Such re-activation may occur in response to user preferences (e.g., automatically transfer, present a prompt on the mobile device, and so on, as is described above).

In some examples, the vehicle may initiate a wi-fi hotspot using a virtual SIM profile. Thus, one user of the vehicle may provide a hotspot to which other user devices, and in some cases the primary device from which the virtual SIM profile has been obtained, can connect. This may reduce battery consumption of a primary device of a user. For example, rather than establishing a wi-fi hotspot with a primary device, which may drain the batter of the primary device, the virtual SIM profile of the primary device may instead be transferred to the vehicle so that the vehicle can produce the hotspot, rather than the primary device. Furthermore, by using the vehicle as the hotspot provider, connection to the primary device is avoided, which reduces security risks in relation to the primary device (e.g., as there is not an available hotspot wi-fi connection from the primary device which may be exploited). Additionally, where users wish to watch or stream the same song, video, etc., one connection may be used. As is described above, by using the vehicle itself as the connection point rather than a primary device, the battery life of the primary device may be conserved.

In some examples, a fleet of devices (e.g., vehicles or drones) may be configured to share a Wi-Fi hotspot generated at one of the devices using a virtual SIM profile which has been transferred to that vehicle.

In some examples, a fleet of devices may transfer their virtual SIM profiles to one of the devices of the fleet (as described above in relation to the vehicle), where that device may then generate a wi-fi hotspot to which the other devices in the fleet may connect. In some examples, the device having the virtual SIM profile may provide instructions, such as directions, to the other devices, instead of or in addition to creating a wi-fi hotspot. For example, the device having the virtual SIM profile may determine or follow a route using connectivity provided via the virtual SIM profile, where the device may then signal to the other devices directions in order that all devices maintain the same route.

In some examples, a virtual SIM profile may be transferred to a target device from a primary device, such as a central device which is configured to manage virtual SIM profiles. For example, for a delivery service, a central device (e.g., a virtual SIM manager) at a hub at which transportation devices (such as drones, vehicles) are based may temporarily transfer a virtual SIM profile to a transportation device prior to the transportation device leaving the hub, where the virtual SIM profile may then be transferred back the central device once the transportation device returns to the hub. Thus, a more efficient use of virtual SIM profiles may be enabled, as it is not necessary for each device to be provisioned with their own virtual SIM.

The processes described above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features and limitations described in any one example may be applied to any other example herein, and flowcharts or examples relating to one example may be combined with any other example in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:

receiving, using control circuitry, a virtual SIM profile at a target device, wherein the virtual SIM profile was previously activated on a primary device;

initiating, using control circuitry, a temporary virtual SIM use session of the virtual SIM profile at the target device after the virtual SIM profile has been suspended at the primary device; and managing, using control circuitry, the virtual SIM profile at the target device by disabling use of the virtual SIM profile at the target device in response to receiving an indication to end the temporary virtual SIM use session, allowing the virtual SIM profile to be reactivated at the primary device.

2. The method of claim 1, wherein the method further comprises, prior to the target device receiving the virtual SIM profile, sending a signal indicating at least one of: a request for use of the virtual SIM profile at the target device, authorization of use of the virtual SIM profile at the target device, a low battery status of the primary device, or multiple failed attempts to unlock the primary device occurring.

3. The method of claim 1, wherein the method further comprises receiving data associated with the virtual SIM profile, and wherein the data comprises at least one of: contacts, call history, application data associated with the primary device, user data associated with the user of the primary device, or operating system settings associated with the primary device.

4. The method of claim 1, wherein the indication to end the virtual SIM use session is based on at least one of: an expiry of a predefined time period, a received request to end the current virtual SIM use session, a number of calls made using the virtual SIM profile at the target device, an incoming call, an incoming text message, or an incoming notification.

5. The method of claim 1, wherein the method further comprises:

receiving, at the target device, a plurality of virtual SIM profiles associated with a plurality of devices; and selecting, from among the plurality of virtual SIM profiles, the virtual SIM profile to use during the virtual SIM use session at the target device, wherein the virtual SIM profile is selected based on at least one of: (a) consistency of coverage of network carriers associated with the plurality of virtual SIM profiles relative to a location of the target device, (b) a strength of coverage of network carriers associated with the plurality of virtual SIM profiles relative to a location of the target device, (c) a data plan associated with the plurality of virtual SIM profiles, or (d) a length of a current journey of the target device.

6. The method of claim 5, wherein the virtual SIM profile is a first virtual SIM profile, the virtual SIM session is a first virtual SIM session, and the method further comprising:

selecting a second virtual SIM profile to use during a second virtual SIM session;

based on the selection of the second virtual SIM profile, notifying a streaming service of the target device currently in use of an upcoming change from the first virtual SIM profile to the second virtual SIM profile.

7. The method of claim 1, wherein the method further comprises causing the target device to initiate a Wi-Fi hotspot based on the virtual SIM profile, wherein the primary device is configured to be coupled to the Wi-Fi hotspot.

8. The method of claim 1, wherein the target device is at least one of: a vehicle, a smartphone, a tablet, a smart watch, a drone, or a device configured to operate as a Wi-Fi hotspot.

9. A system comprising control circuitry configured to:

receive a virtual SIM profile at a target device, wherein the virtual SIM profile was previously activated on a primary device;

initiate a temporary virtual SIM use session of the virtual SIM profile at the target device after the virtual SIM profile has been suspended at the primary device; and manage the virtual SIM profile at the target device by disabling use of the virtual SIM profile at the target device in response to receiving an indication to end the temporary virtual SIM use session, allowing the virtual SIM profile to be reactivated at the primary device.

10. The system of claim 9, wherein the control circuitry is further configured to, prior to the target device receiving the virtual SIM profile, send a signal indicating at least one of: a request for use of the virtual SIM profile at the target device, authorization of use of the virtual SIM profile at the target device, a low battery status of the primary device, or multiple failed attempts to unlock the primary device occurring.

11. The system of claim 9, wherein the control circuitry is further configured to receive data associated with the virtual SIM profile, and wherein the data comprises at least one of: contacts, call history, application data associated with the primary device, user data associated with the user of the primary device, or operating system settings associated with the primary device.

12. The system of claim 9, wherein the indication to end the virtual SIM use session is based on at least one of: an expiry of a predefined time period, a received request to end the current virtual SIM use session, a number of calls made using the virtual SIM profile at the target device, an incoming call, an incoming text message, or an incoming notification.

13. The system of claim 9, wherein the control circuitry is further configured to:

receive, at the target device, a plurality of virtual SIM profiles associated with a plurality of devices; and select, from among the plurality of virtual SIM profiles, the virtual SIM profile to use during the virtual SIM use session at the target device, wherein the virtual SIM profile is selected based on at least one of: (a) consistency of coverage of network carriers associated with the plurality of virtual SIM profiles relative to a location of the target device, (b) a strength of coverage of network carriers associated with the plurality of virtual SIM profiles relative to a location of the target device, (c) a data plan associated with the plurality of virtual SIM profiles, or (d) a length of a current journey of the target device.

14. The system of claim 9, wherein the control circuitry is further configured to cause the target device to initiate a Wi-Fi hotspot based on the virtual SIM profile, wherein the primary device is configured to be coupled to the Wi-Fi hotspot.

15. The system of claim 9, wherein the target device is at least one of: a vehicle, a smartphone, a tablet, a smart watch, a drone, or a device configured to operate as a Wi-Fi hotspot.

16. The method of claim 1, wherein the target device is a vehicle and the primary device is a mobile device, and the temporary virtual SIM use session at the target device is initiated based at least in part on detecting that the mobile device is within the vehicle.

17. The method of claim 1, wherein the temporary virtual SIM use session at the target device is initiated based at least in part on receiving an indication of a low battery status of the primary device.

18. The method of claim 1, wherein the primary device is a first mobile device and the target device is a second mobile device, and wherein the virtual SIM profile is transferred from the first mobile device to the second mobile device by way of a server, the server being coupled to the first mobile device and the second mobile device by way of one or more networks.

19. The method of claim 1, wherein the primary device is a first mobile device and the target device is a second mobile device, and wherein the temporary virtual SIM use session at the target device is initiated based at least in part on determining that each of the first mobile device and the second mobile device is associated with a same user.

20. The method of claim 1, wherein the indication to end the virtual SIM use session is based on at least one of: an expiry of a predefined time period, a number of calls made using the virtual SIM profile at the target device, an incoming call, an incoming text message, or an incoming notification.

* * * * *